United States Patent
Yamada et al.

(10) Patent No.: US 8,238,035 B2
(45) Date of Patent: Aug. 7, 2012

(54) ZOOM LENS AND IMAGE PICKUP APPARATUS EQUIPPED WITH SAME

(75) Inventors: Yasuharu Yamada, Sagamihara (JP); Toru Miyajima, Hachioji (JP); Ayami Imamura, Hachioji (JP)

(73) Assignees: Olympus Corporation, Tokyo (JP); Olympus Imaging Corp., Tokyo (JP)

( * ) Notice: Subject to any disclaimer, the term of this patent is extended or adjusted under 35 U.S.C. 154(b) by 59 days.

(21) Appl. No.: 12/925,962

(22) Filed: Nov. 2, 2010

(65) Prior Publication Data
US 2011/0109978 A1    May 12, 2011

(30) Foreign Application Priority Data

Nov. 12, 2009 (JP) .................................. 2009-258861
Apr. 13, 2010 (JP) .................................. 2010-092108

(51) Int. Cl.
*G02B 15/14* (2006.01)

(52) U.S. Cl. ....................................... 359/684; 359/683

(58) Field of Classification Search ............... 348/240.3, 348/335, 340; 359/683, 684, 686, 688
See application file for complete search history.

(56) References Cited

U.S. PATENT DOCUMENTS

| 5,061,051 A * | 10/1991 | Miyamae ..................... 359/683 |
| 5,606,459 A | 2/1997 | Nakatsuji |
| 5,856,885 A * | 1/1999 | Yamamoto ..................... 359/684 |
| 6,987,622 B2 * | 1/2006 | Nurishi ..................... 359/684 |
| 2011/0317284 A1* | 12/2011 | Imamura ..................... 359/745 |

FOREIGN PATENT DOCUMENTS

| JP | 08-068941 | 3/1996 |
| JP | 10-048518 | 2/1998 |

* cited by examiner

*Primary Examiner* — David N Spector
(74) *Attorney, Agent, or Firm* — Kenyon & Kenyon LLP

(57) ABSTRACT

A zoom lens according to the present invention includes, in order from the object side to the image side, a first lens unit having a positive refracting power, a second lens unit having a negative refracting power, a third lens unit having a negative refracting power, and a fourth lens unit having a positive refracting power, wherein during zooming from the wide angle end to the telephoto end, the first lens unit, the second lens unit, the third lens unit, and the fourth lens unit move in such a way that they are located closer the object side at the telephoto end than at the wide angle end, the distance between the first lens unit and the second lens unit is larger at the telephoto end than at the wide angle end, the distance between the second lens unit and the third lens unit is larger at the telephoto end than at the wide angle end, and the distance between the third lens unit and the fourth lens unit is smaller at the telephoto end than at the wide angle end. The zoom lens satisfies a predetermined condition.

17 Claims, 13 Drawing Sheets

435.84 —··—··— g
486.13 —·—·— F
656.27 ------- C
587.56 ——— d

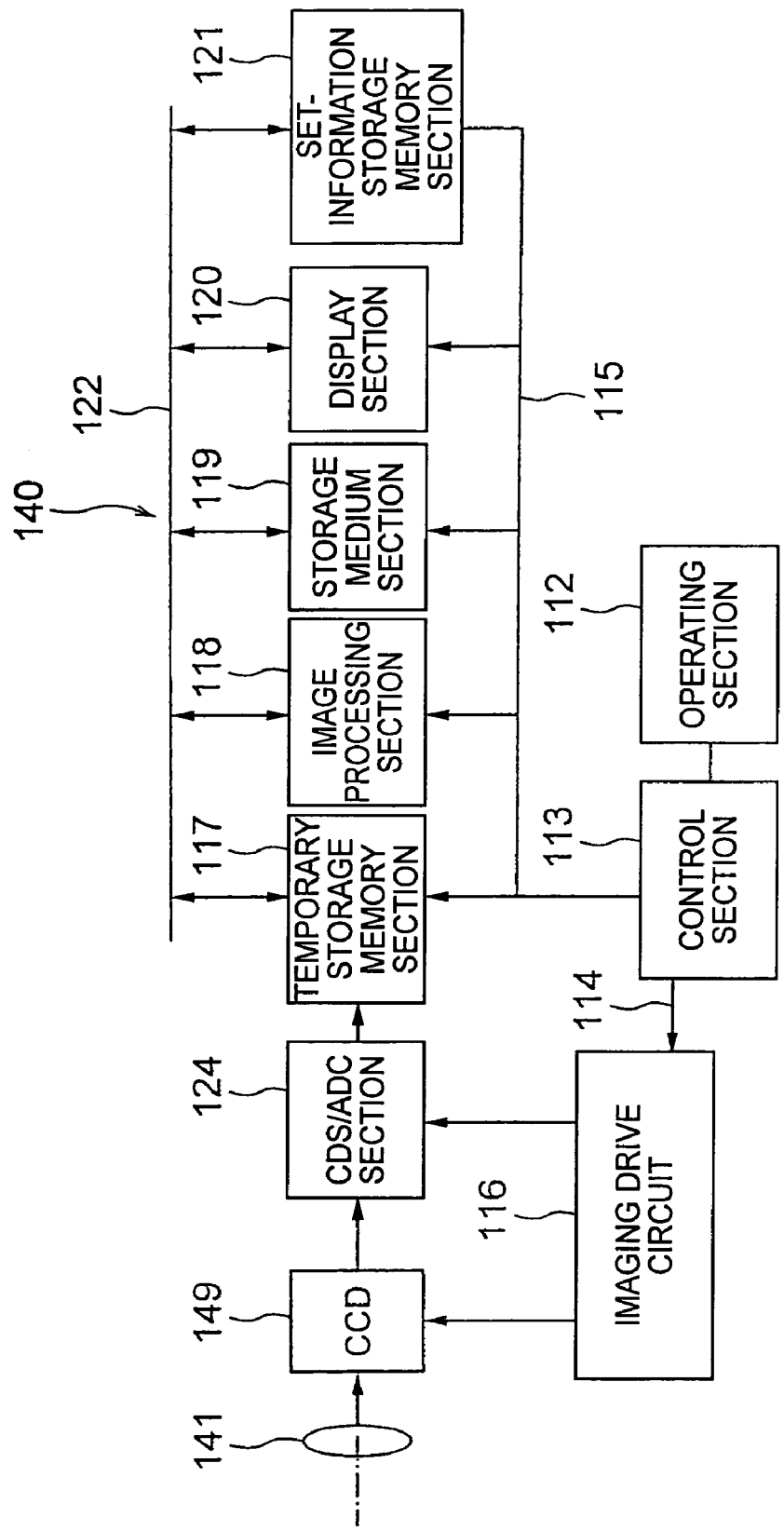

435.84 —··—··— g
486.13 —·—·— F
656.27 ------- C
587.56 ——— d

ZOOM LENS AND IMAGE PICKUP APPARATUS EQUIPPED WITH SAME

CROSS-REFERENCE TO RELATED APPLICATION

The present application is based upon and claims the benefit of priority from the prior Japanese Patent Application No. 2009-258861 filed on Nov. 12, 2009 and No. 2010-092108 filed on Apr. 13, 2010; the entire contents of which are incorporated herein by reference.

BACKGROUND OF THE INVENTION

1. Field of the Invention

The present invention relates to a zoom lens that is advantageous in achieving a high zoom ratio. The present invention also relates to an image pickup apparatus equipped with a zoom lens, such as a video camera or a digital camera.

2. Description of the Related Art

Zoom lenses having, at least, a first lens unit having a positive refracting power, a second lens unit having a negative refracting power, a third lens unit having a negative refracting power, and a fourth lens unit having a positive refracting power that are arranged in order from the object side to the image side and move during zooming in such a way that they are located closer the to the object side at the telephoto end than at the wide angle end have been know from Japanese Patent application Nos. 10-48518 and 8-68941.

In these zoom lenses, the distance between the first lens unit and the second lens unit and the distance between the second lens unit and the third lens unit are larger at the telephoto end than at the wide angle end, while the distance between the third lens unit and the fourth lens unit is smaller at the telephoto end than at the wide angle end.

This way of movement of the lens units can contribute to a decrease in the overall length of the zoom lens at the wide angle end and facilitate achieving an adequate angle of view. In addition, having a higher negative refracting power of the composite system of the second lens unit and the third lens unit at the telephoto end than at the wide angle end is advantageous in achieving good optical performance and an adequate zoom ratio of the zoom lens.

SUMMARY OF THE INVENTION

A zoom lens according to the present invention comprises, in order from an object side to an image side:
a first lens unit having a positive refracting power;
a second lens unit having a negative refracting power;
a third lens unit having a negative refracting power; and
a fourth lens unit having a positive refracting power, wherein during zooming from the wide angle end to the telephoto end, the first lens unit, the second lens unit, the third lens unit, and the fourth lens unit move in such a way that they are each located closer to the object side at the telephoto end than at the wide angle end, a distance between the first lens unit and the second lens unit is larger at the telephoto end than at the wide angle end, a distance between the second lens unit and the third lens unit is larger at the telephoto end than at the wide angle end, and a distance between the third lens unit and the fourth lens unit is smaller at the telephoto end than at the wide angle end, and the zoom lens satisfies the following conditions:

$$1.5 \leq f1/(fw \cdot fT)^{1/2} \leq 2.1 \quad (1) \text{ and}$$

$$0.9 \leq f2/f3 \leq 1.7 \quad (2),$$

where f1 is the focal length of the first lens unit, f2 is the focal length of the second lens unit, f3 is the focal length of the third lens unit, fw is the focal length of the entire zoom lens system at the wide angle end, and fT is the focal length of the entire zoom lens system at the telephoto end.

An image pickup apparatus according to another aspect of the present invention comprises:
the above-described zoom lens; and
an image pickup element that is disposed on the image side of the zoom lens and converts an optical image formed by the zoom lens into an electrical signal.

BRIEF DESCRIPTION OF THE DRAWINGS

FIG. 11 is a block diagram showing the internal circuit configuration of a relevant portion of the digital camera;

DETAILED DESCRIPTION OF THE INVENTION

Figure 1A:
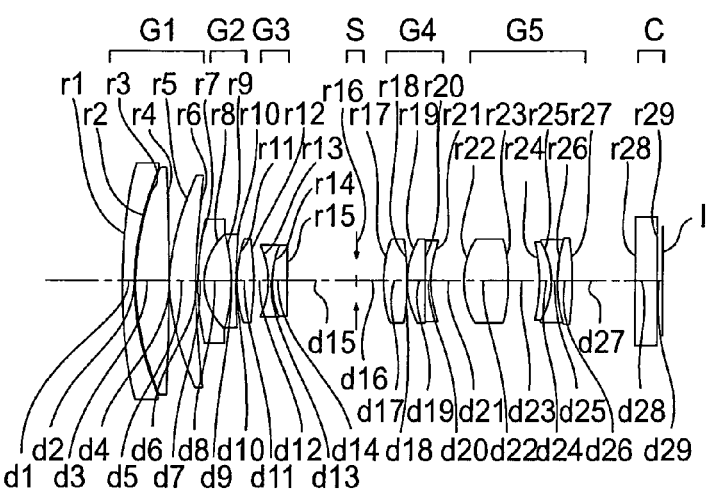
FIGS. 1A, 1B, and 1C are cross sectional views of a zoom lens according to a first embodiment in the state in which the zoom lens is focused on an object point at infinity at the wide angle end (FIG. 1A), in an intermediate focal length state (FIG. 1B), and at the telephoto end (FIG. 1C) respectively.

The zoom lens according to the present invention includes, in order from the object side to the image side, a first lens unit having a positive refracting power, a second lens unit having a negative refracting power, a third lens unit having a negative refracting power, and a fourth lens unit having a positive refracting power, wherein during zooming from the wide angle end to the telephoto end, the first lens unit, the second lens unit, the third lens unit, and the fourth lens unit move in such a way that they are each located closer the object side at the telephoto end than at the wide angle end, the distance between the first lens unit and the second lens unit is larger at the telephoto end than at the wide angle end, the distance between the second lens unit and the third lens unit is larger at the telephoto end than at the wide angle end, and the distance between the third lens unit and the fourth lens unit is smaller at the telephoto end than at the wide angle end, and the following conditions are satisfied:

$$1.5 \leq f1/(fw \cdot fT)^{1/2} \leq 2.1 \quad (1)$$

and $$0.9 \leq f2/f3 \leq 1.7 \quad (2),$$

where f1 is the focal length of the first lens unit, f2 is the focal length of the second lens unit, f3 is the focal length of the third lens unit, fw is the focal length of the entire zoom lens system at the wide angle end, and fT is the focal length of the entire zoom lens system at the telephoto end.

Zoom lenses having, in order from the object side, a positive first lens unit, a negative second lens unit, a negative third lens unit, and a positive fourth lens unit can easily be designed to have a relatively large zoom ratio. In addition, moving a plurality of lens unit during zooming facilitates sharing the aberration correction among the plurality of lens units. Therefore, such lens design is advantageous in achieving good optical performance.

According to the present invention, the first lens unit is located closer to the image plane of the zoom lens at the wide angle end. This is advantageous in achieving an adequate angle of view and decreasing the overall length of the zoom lens at the wide angle end.

To reduce aberrations at zoom positions near the telephoto end in a zoom lens having a high zoom ratio, it is preferred that the refracting power of the first lens unit be moderately low. Condition (1) is introduced to reduce aberrations generated by the first lens unit at zoom positions near the telephoto end to a moderate extent in zoom lenses having a high zoom ratio.

On the other hand, to achieve an adequate zoom ratio while making the refracting power of the first lens unit low, it is necessary for the second lens unit and the third lens unit having a negative refracting power to provide adequate magnification change. To this end, it is necessary for the composite system of the second lens unit and the third lens unit to have an adequate negative refracting power. Then, in order to suppress variations in aberrations during zooming, it is important to distribute the negative refracting power to the second lens unit and the third lens unit appropriately.

Condition (2) is introduced to achieve appropriate distribution of the negative refracting power among the second lens unit and the third lens unit. Condition (2) makes the negative refracting power of the third lens unit adequately high. This is advantageous in reducing variations in aberrations when the zoom lens has a high zoom ratio.

As the lower limit of condition (1) is not exceeded, the first lens unit has a moderately low positive refracting power. This is advantageous in reducing aberrations such as chromatic aberration and spherical aberration at the telephoto end.

As the upper limit of condition (1) is not exceeded, the first lens unit has an adequate positive refracting power. This is advantageous in preventing an increase in the size of the overall length of the zoom lens at the telephoto end. In addition, this is also advantageous in preventing deterioration of the performance caused by decentering due to the weight of the first lens unit.

As the lower limit of condition (2) is not exceeded, the second lens unit has a moderately low negative refracting power, and the third lens unit has an adequate negative refracting power. Thus, the composite system of the second lens unit and the third lens unit can provide an adequate function (i.e. the function of making the negative refracting power high at the telephoto end). This is advantageous in correcting curvature of field and chromatic aberration of magnification, and spherical aberration at the telephoto end.

As the upper limit of condition (2) is not exceeded, the third lens unit can be prevented from having an excessively high negative refracting power. This is advantageous in correcting curvature of field and spherical aberration at the telephoto end.

An additional effect of satisfying condition (2) is that the third lens unit has an appropriate negative refracting power. Therefore, when the third lens unit is moved for focusing, the amount of movement of the third lens unit toward the object side for focusing toward shorter distance can be made appropriate. This is advantageous in achieving an adequate focusing range and in controlling the movement of the third lens unit. Although it is preferred that focusing be performed by moving the third lens unit, other lens(es) may be moved for focusing.

It is more preferred that one, some, or all of the following features be adopted.

It is preferred that the zoom ratio of the zoom lens satisfy the following condition:

$$7 < fT/fw < 30 \quad (A).$$

Condition (A) specifies a preferred range of the zoom ratio. If the lower limit of condition (A) is not exceeded, the zoom lens has an adequate zoom ratio, enabling shooting in various shooting situations.

If the upper limit of condition (A) is not exceeded, adequate brightness (or lens speed) can easily be achieved at the telephoto end. This facilitates preventing image blur due to camera shake and under exposure.

It is also preferred that the following condition be satisfied:

$$2.7 < |f1/f3| < 5.5 \quad (B).$$

Not exceeding the lower limit of condition (B) is advantageous in achieving both an adequate zoom ratio and a reduction of spherical aberration at the telephoto end.

Not exceeding the upper limit of condition (B) is advantageous in reducing the overall length of the zoom lens at the telephoto end and reducing aberrations generated by the third lens unit.

It is also preferred that the first lens unit include at least two positive lens elements and satisfy the following condition:

$$vp1 \geq 65.00 \quad (3),$$

where vp1 is the average of the Abbe constants of all the positive lens elements in the first lens unit with respect to the d-line.

If the lower limit of condition (3) is not exceeded, the dispersion of the positive lens elements in the first lens unit is made low. This facilitates a reduction in chromatic aberration of magnification at the telephoto end and provides an advantage in achieving good performance.

It is also preferred that the first lens unit include at least one negative lens element that satisfies the following condition:

$$\theta n1g,F \leq 0.610 \quad (4),$$

where $\theta n1g, F$ is the relative partial dispersion of the negative lens element in the first lens unit with respect to the g-line and the F-line. The relative partial dispersion $\theta n1g,F$ of a lens is defined by the equation $\theta n1g,F=(ng-nF)/(nF-nC)$, where ng, nF, nC are the refractive indices of the lens for the g-line, the F-line, and the C-line.

If the upper limit of condition (4) is not exceeded, the relative partial dispersion of the negative lens element in the first lens unit with respect to the g-line and the F-line is low. This prevents an increase in chromatic aberration of magnification (in particular, in the wavelength range below the F-line) at the telephoto end and facilitates aberration correction.

It is also preferred that the zoom lens further have a fifth lens unit having a positive refracting power that is disposed on the image side of the fourth lens unit and moves during zooming from the wide angle end to the telephoto end in such a way that it is located closer to the object side at the telephoto end than at the wide angle end, and the distance between the fourth lens unit and the fifth lens unit be smaller at the telephoto end than at the wide angle end.

With this configuration, variations in curvature of field during zooming from the wide angle end to the telephoto end can be corrected by changing the air gap between the fourth lens unit and the fifth lens unit. In addition, locating the fifth lens unit having a positive refracting power at a position close to the image plane in the zoom lens facilitates making the exit pupil position more distant from the image plane. This is advantageous in achieving the telecentricity. Furthermore, this is advantageous in reducing shading, when an image pickup element such as a CCD or CMOS sensor is used with the zoom lens.

Then, furthermore, it is more preferred that during zooming from the wide angle end to the telephoto end, the fourth lens unit and the fifth lens unit move in such a way that the following condition is satisfied:

$$0.01 < dD45/ft < 0.06 \quad (C),$$

where dD45 is the decrease in the distance between the fourth lens unit and the fifth lens unit with zooming from the wide angle end to the telephoto end.

If the lower limit of condition (C) is not exceeded, the decrease in the distance between the fourth lens unit and the fifth lens unit will be large enough to further facilitate correction of variations in curvature of field during zooming.

If the upper limit of condition (C) is not exceeded, changes in the refracting power of the composite system of the fourth lens unit and the fifth lens unit can be made small, and variations in aberrations caused by overcorrection of curvature of field can be made small. This is also advantageous in reducing the overall length of the zoom lens at the wide angle end and in achieving an adequate zoom ratio.

It is also preferred that the fifth lens unit have a cemented lens component having a negative refracting power including a positive meniscus lens element having a concave surface directed toward the object side, a biconcave negative lens element, and a biconvex positive lens element, which are arranged in order from the object side to the image side, and satisfy the following condition:

$$1.3 \leq f5cem|/fw \leq 2.5 \quad (5),$$

where f5cem is the composite focal length of the cemented lens component in the fifth lens unit.

Having the cemented lens component as the fifth lens unit is advantageous in correcting chromatic aberration of magnification and curvature of field.

In the context of this specification, the term "lens component" refers to a lens member whose refractive surfaces that are in contact with air in an optical path include only two surfaces or an object side surface and an image side surface.

If the lower limit of condition (5) is not exceeded so that the cemented lens component is prevented from having an excessively high negative refracting power, the exit angle of rays in the peripheral region of the image at the wide angle end is made small. This is advantageous in reducing shading. In addition, this can decrease positive spherical aberration at the telephoto end.

If the upper limit of condition (5) is not exceeded so that the cemented lens component has an adequate negative refracting power, negative curvature of field can be decreased.

The above-mentioned cemented lens component in the fifth lens unit may be replaced by a cemented lens component including, in order from the object side to the image side, a positive meniscus lens element having a concave surface directed toward the object side, a negative meniscus lens element having a concave surface directed toward the object side, and a positive meniscus lens element having a concave surface directed toward the object side. This configuration of the cemented lens is advantageous in reducing rotationally asymmetric aberrations that are generated when the cemented lens component is decentered.

Therefore, the fifth lens unit may include a cemented lens component having a negative refracting power including, in order from the object side to the image side, a positive meniscus lens element having a concave surface directed toward the object side, a negative meniscus lens element having a concave surface directed toward the object side, and a positive meniscus lens element having a concave surface directed toward the object side.

Furthermore, it is preferred that the fifth lens unit includes, in order from the object side to the image side, a biconvex lens component and either one of the above-mentioned cemented lens components having a negative refracting power.

With this configuration of the fifth lens unit, the biconvex lens component can mainly correct spherical aberration, and the cemented lens component having a negative refracting power can correct curvature of field etc. Therefore, the number of lens components in the fifth lens unit can be made as small as two. This makes the manufacturing of the lens easy. In addition, smallness in size and high optical performance can be achieved.

It is also preferred that for focusing from an object at a long distance to an object at a short distance, only the third lens unit be moved toward the object side.

By advancing only the third lens unit toward the object side during focusing from an object at a long distance to an object at a short distance, variations in curvature of field etc. can be made as small as possible. Therefore, high optical performance can easily be achieved throughout the object distance range from long distance to short distance. In addition, since the third lens unit can be constructed by a small number of lenses, the lens unit can be light in weight, making the load on the motor for driving the lens unit small. This is advantageous in achieving high focusing speed.

Specifically, the third lens unit may consist of one negative lens element or one cemented lens component. This is advantageous in achieving high focusing speed.

It is preferred that the zoom lens include an aperture stop that is disposed between the third lens unit and the fourth lens unit, and the distance between the aperture stop and the fourth lens unit on the optical axis be smaller at the telephoto end than at the wide angle end.

With this configuration, the position of the aperture stop on the optical axis relative to the fourth lens unit is closer to the object side at the wide angle end than at the telephoto end. This facilitates making the position of the exit pupil more distant from the image plane at the wide angle end, at which the exit angle of off-axis rays passing through the zoom lens tends to be large. Therefore, the zoom lens can be designed to have high telecentricity and is advantageous in reducing shading. In addition, since this configuration makes the position of the entrance pupil closer to the object side at the wide angle end, the effective diameter of the first lens unit can be made smaller. This is advantageous in reducing the overall size of the zoom lens.

It is preferred that each of the second, fourth, and fifth lens units have at least one aspheric surface.

If this is the case, correction of aberrations such as barrel distortion that tends to occur at the wide angle end and spherical aberration and curvature of field at the telephoto end can further be facilitated. This is advantageous in achieving size reduction and good optical performance.

It is also preferred that during zooming from the wide angle end to the telephoto end, the first lens unit, the second lens unit, the third lens unit, and the fourth lens unit move only toward the object side.

This facilitates correction of aberrations during zooming while achieving both a reduction in the size of the zoom lens at the wide angle end and a high zoom ratio.

It is also preferred that the second lens unit and the third lens unit move in such a way that the following condition is satisfied:

$$0 < M3/dD12 < 10 \qquad (D),$$

where M3 is the amount of movement of the third lens unit with zooming from the wide angle end to the telephoto end with movement toward the object side being represented by a positive value, and dD12 is the increase in the distance between the second lens unit and the third lens unit with zooming from the wide angle end to the telephoto end.

If the lower limit of condition (D) is not exceeded so that the amount of movement of the third lens unit is adequate, and the position of the third lens unit is made closer to the image side at the wide angle end, a reduction in the overall length of the zoom lens at the wide angle end and a reduction in the diameter of the zoom lens are facilitated.

If the upper limit of condition (D) is not exceeded so that the amount of movement of the third lens unit toward the object side is made small, the composite system of the second lens unit and the third lens unit can easily be designed to have an adequate negative refracting power at the telephoto end. This is advantageous in achieving an adequate zoom ratio and in reducing the size of the lens at the telephoto end.

It is preferred that the image pickup apparatus according to the present invention comprise a zoom lens having one or more of the above-described features and an image pickup element that is disposed on the image side of the zoom lens and converts an optical image formed by the zoom lens into an electrical signal.

Thus, there can be provided an image pickup apparatus equipped with a zoom lens that has good optical performance and is short in overall length at the wide angle end while having a high zoom ratio.

A flare stop may be provided in addition to the aperture stop in order to eliminate unwanted light that may cause ghost images, lens flare or the like. The flare stop may be disposed on the object side of the first lens unit, between the first lens unit and the second lens unit, between the second lens unit and the third lens unit, or between the third lens unit and the fourth lens unit. The aperture of the flare stop may have various shapes such as circular, elliptical, rectangular, or polygonal shape, or the shape of the aperture may be defined by a curve specified by a mathematical function. The flare stop may be adapted to cut not only detrimental beams but also beams that may cause coma flare etc. in the peripheral region of the picture area.

Anti-reflection coating may be applied on each lens to reduce ghost images and lens flare. The use of multi-layer coating, which can reduce ghost images and lens flare effectively, is desirable. Coating for cutting infrared light may be applied on a lens surface (s) and/or the cover glass etc.

Brightness fall-off (or shading) in the peripheral region of picked-up images may be reduced by shifting the positions of micro lenses that are arranged just in front of the image pickup surface of the image pickup element. For example, the design of the micro lenses on the CCD may be varied in accordance with changes in the angle of incidence of rays at different image heights. Brightness fall-off in the peripheral region of images may be compensated by image processing.

The optical system may intentionally be designed to have distortion, which may be corrected by electrical image processing after the image picking-up.

It is preferred that two or more of the above-described features and conditions be adopted in combination.

In cases where the zoom lens is provided with a focusing mechanism, the above-described features and conditions should be interpreted as those in the state in which the zoom lens is focused on the farthest distance.

It is more preferred that the conditional expressions presented in the foregoing be modified as follows in order that the advantages can be enjoyed more surely.

In condition (1), it is more preferred that the lower limit value be 1.65, still more preferably 1.6, and the upper limit value be 2.0, still more preferably 1.9.

In condition (3), it is more preferred that the lower limit value be 68, still more preferably 71. Although the condition (3) does not have an upper limit, it may have an upper limit of 95. If this upper limit is not exceeded, the availability and ease of processing of the optical material will be enhanced.

In condition (4), it is more preferred that the upper limit value be 0.66, still more preferably 0.63. Although the condition (4) does not have a lower limit, it may have a lower limit of 0.53. If this lower limit is not exceeded, the availability of the material and economy will be enhanced.

In condition (5), it is more preferred that the lower limit value be 1.5, still more preferably 1.7, and the upper limit value be 2.4, still more preferably 2.3.

In condition (A), it is more preferred that the lower limit value be 8, still more preferably 9, and the upper limit value be 20, still more preferably 15.

In condition (B), it is more preferred that the lower limit value be 2.8, and the upper limit value be 4.0, still more preferably 3.8.

In condition (C), it is more preferred that the lower limit value be 0.02, still more preferably 0.025, and the upper limit value be 0.055, still more preferably 0.05.

In condition (D), it is more preferred that the lower limit value be 1, still more preferably 2, and the upper limit value be 8, still more preferably 6.

In the following, embodiments of the zoom lens and the image pickup apparatus according to the present invention will be described in detail with reference to the drawings. It should be understood that the present invention is not limited by the embodiments.

In the following, first to fourth embodiments of the zoom lens according to the present invention will be described. FIGS. 1A to 1C, 2A to 2C, 3A to 3C, and 12A to 12C are cross sectional views of the zoom lens according to the first, second, third and fourth embodiments respectively at the wide angle end (FIGS. 1A, 2A, 3A, and 12A), in an intermediate focal length state (FIGS. 1B, 2B, 3B, and 12B), and at the telephoto end (FIGS. 10, 2C, 3C, and 12C). In FIGS. 1A to 1C, 2A to 2C, 3A to 3C, and 12A to 12C, a first lens unit is denoted by G1, a second lens unit is denoted by G2, an aperture stop is denoted by S, a third lens unit is denoted by G3, a fourth lens unit is denoted by G4, a fifth lens unit is denoted by G5, a plane parallel plate constituting a cover glass for an electronic image pickup element (CCD or CMOS sensor) is denoted by C or CG, and the image plane is denoted by I. The cover glass C or CG may have a multi-layer film for wavelength range restriction applied on its surface. The cover glass C or CG may be designed to have the function of a low pass filter on which wavelength range restriction filter that blocks or reduces infrared light is applied.

All the numerical data presented below are for the state in which the zoom lens is focused on an object at infinity. In the numerical data, dimensions are in mm (millimeters) and angles are in degrees. In all the embodiments, the focusing operation from an object at a long distance to an object at a short distance is performed by moving the third lens unit G3 toward the object side. Zoom data will be presented for the wide angle end, the intermediate focal length state, and the telephoto end.

Figure 1B:
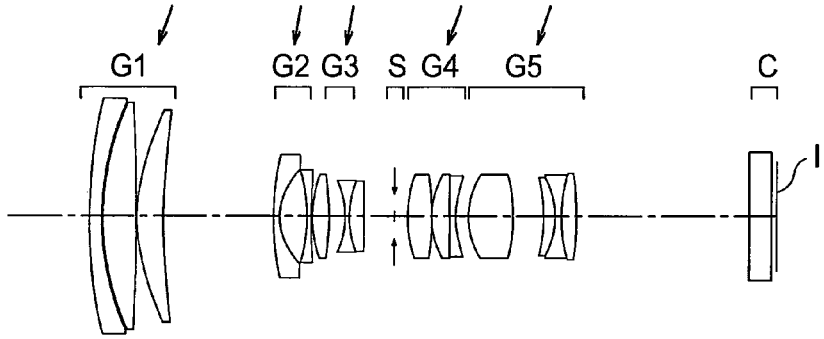
Figure 1C:
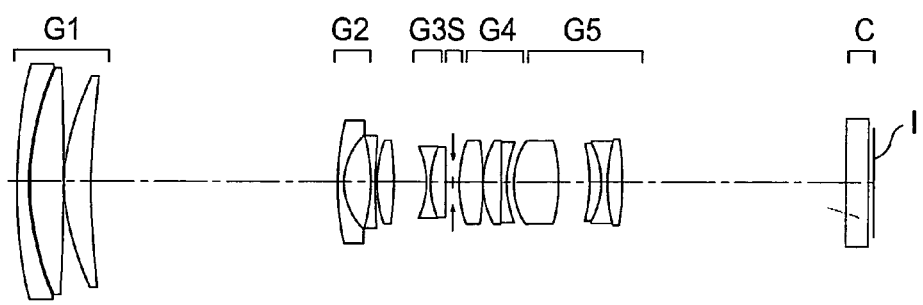

As shown in FIGS. 1A, 1B, and 1C, the zoom lens according to the first embodiment includes, in order from the object side, a first lens unit G1 having a positive refracting power, a second lens unit G2 having a negative refracting power, a third lens unit G3 having a negative refracting power, an aperture stop S, a fourth lens unit G4 having a positive refracting power, and a fifth lens unit G5 having a positive refracting power.

During zooming from the wide angle end to an intermediate focal length state and during zooming from the intermediate focal length state to the telephoto end, the first lens unit G1, the second lens unit G2, the third lens unit G3, the aperture stop S, the fourth lens unit G4, and the fifth lens unit G5 move toward the object side.

The first lens unit G1 is composed of a negative meniscus lens having a convex surface directed toward the object side, a biconvex positive lens, and a positive meniscus lens having a convex surface directed toward the object side. The second lens unit G2 is composed of a negative meniscus lens having a convex surface directed toward the object side, a biconcave negative lens, and a biconvex positive lens. The third lens unit G3 is composed of a cemented lens made up of a biconcave negative lens and a biconvex positive lens. The fourth lens unit G4 is composed of a biconvex positive lens, and a cemented lens made up of a biconvex positive lens and a biconcave negative lens. The fifth lens unit G5 is composed of a biconvex positive lens, and a cemented lens made up of a positive meniscus lens having a convex surface directed toward the image side, a biconcave negative lens, and a biconvex positive lens. The lens elements in each lens unit G1, G2, G3, G4, G5 are arranged in the mentioned order from the object side.

There are six aspheric surfaces, which include the both surfaces of the negative meniscus lens in the second lens unit G2, both surfaces of the object side biconvex positive lens in the fourth lens unit G4, and both surfaces of the object side biconvex positive lens in the fifth lens unit G5.

Figure 2A:
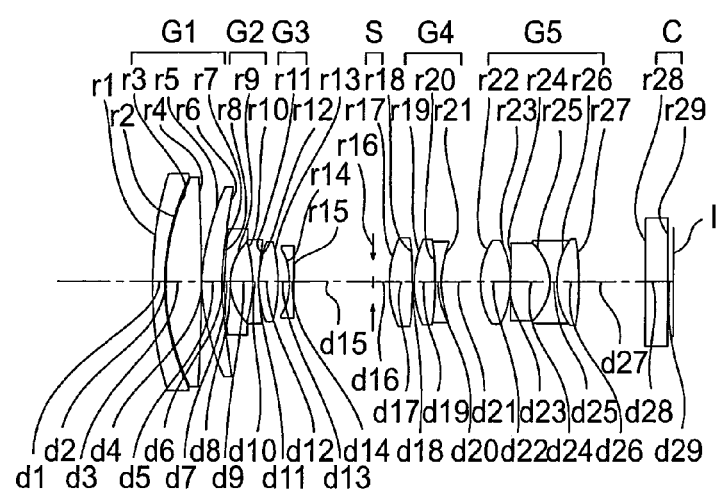
FIGS. 2A, 2B, and 2C are cross sectional views similar to FIGS. 1A, 1B, and 1C showing a zoom lens according to a second embodiment of the present invention.
Figure 2B:
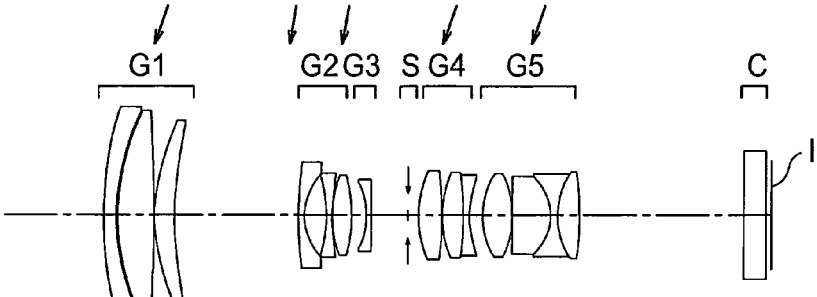
Figure 2C:
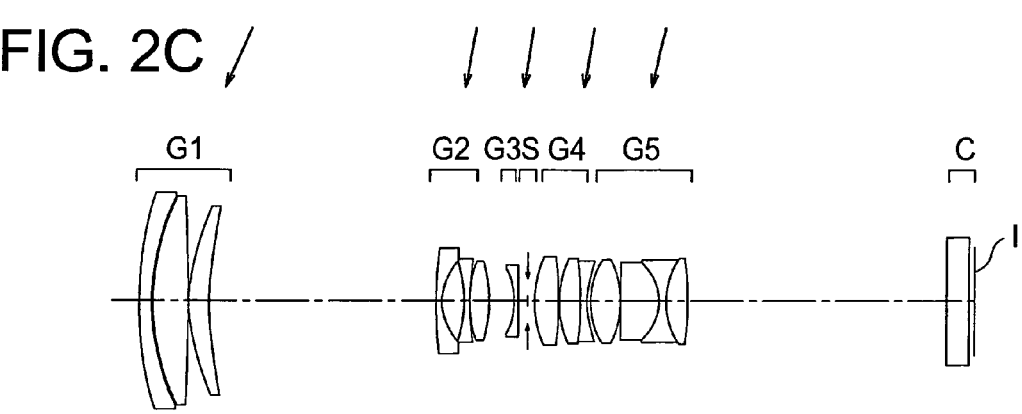

As shown in FIGS. 2A, 2B, and 2C, the zoom lens according to the second embodiment includes, in order from the object side, a first lens unit G1 having a positive refracting power, a second lens unit G2 having a negative refracting power, a third lens unit G3 having a negative refracting power, an aperture stop S, a fourth lens unit G4 having a positive refracting power, and a fifth lens unit G5 having a positive refracting power.

During zooming from the wide angle end to the intermediate focal length state and during zooming from the intermediate focal length state to the telephoto end, the first lens unit G1, the second lens unit G2, the third lens unit G3, the aperture stop S, the fourth lens unit G4, and the fifth lens unit G5 move toward the object side.

The first lens unit G1 is composed of a negative meniscus lens having a convex surface directed toward the object side, a biconvex positive lens, and a positive meniscus lens having a convex surface directed toward the object side. The second lens unit G2 is composed of a negative meniscus lens having a convex surface directed toward the object side and having an aspheric surface layer provided on its object side, a biconcave negative lens, and a biconvex positive lens. The third lens unit G3 is composed of a negative meniscus lens having a convex surface directed toward the image side. The fourth lens unit G4 is composed of a biconvex positive lens, and a cemented lens made up of a biconvex positive lens and a biconcave negative lens. The fifth lens unit G5 is composed of a biconvex positive lens, and a cemented lens made up of a positive meniscus lens having a convex surface directed toward the image side, a biconcave negative lens, and a biconvex positive lens. The lens elements in each lens unit G1, G2, G3, G4, G5 are arranged in the mentioned order from the object side.

There are five aspheric surfaces, which include the layer provided on the object side surface of the negative meniscus lens in the second lens unit G2, both surfaces of the object side biconvex positive lens in the fourth lens unit G4, and both surfaces of the object side biconvex positive lens in the fifth lens unit G5.

Figure 3A:
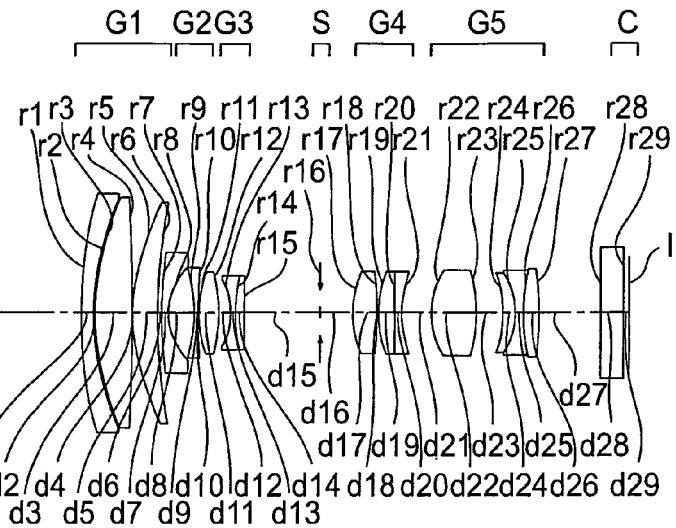
FIGS. 3A, 3B, and 3C are cross sectional views similar to FIGS. 1A, 1B, and 1C showing a zoom lens according to a third embodiment of the present invention.
Figure 3B:
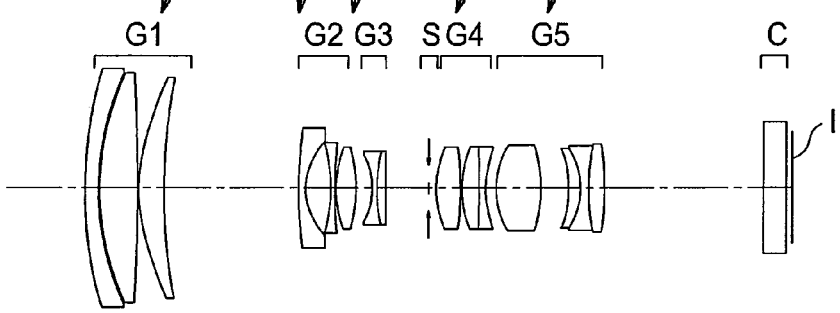
Figure 3C:
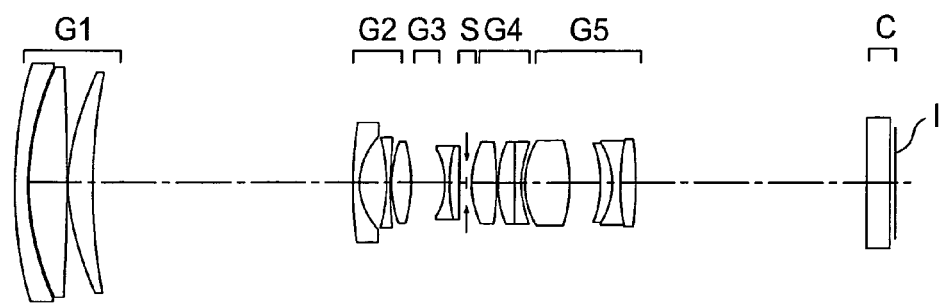
Figure 4A:
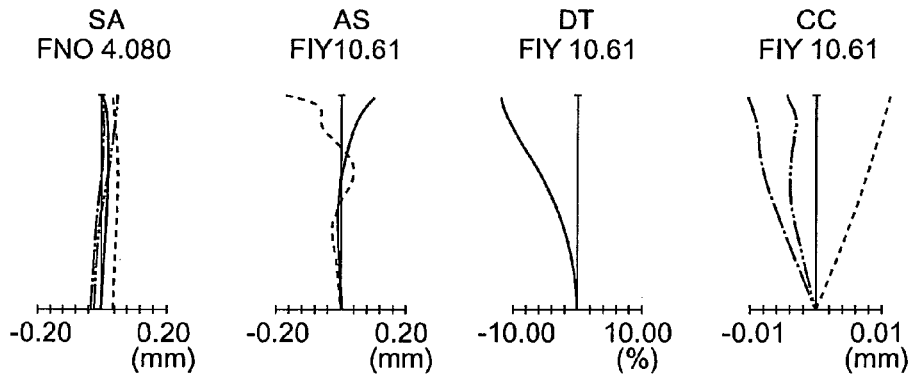
FIGS. 4A, 4B, and 4C are aberration diagrams of the zoom lens according to the first embodiment in the state in which the zoom lens is focused on an object point at infinity.
Figure 4B:
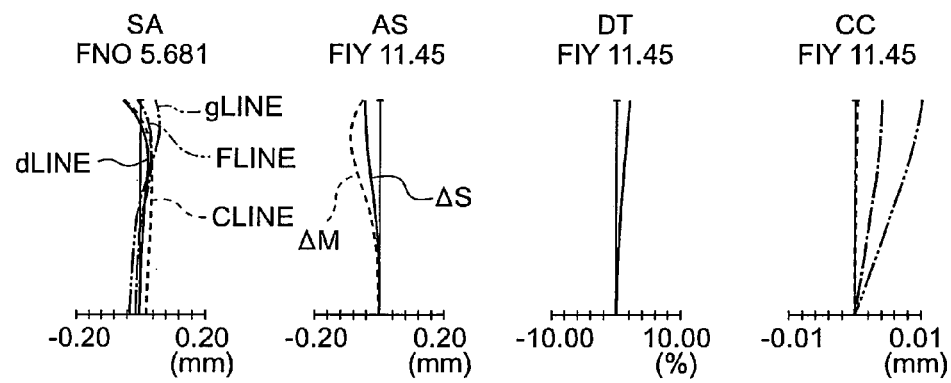
Figure 4C:
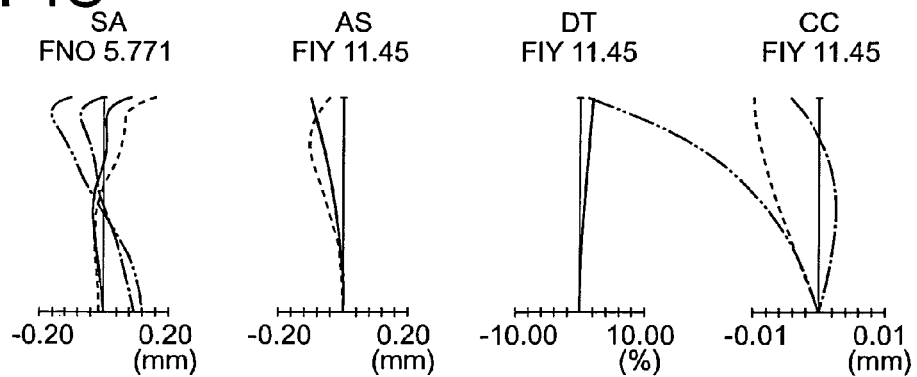
Figure 5A:
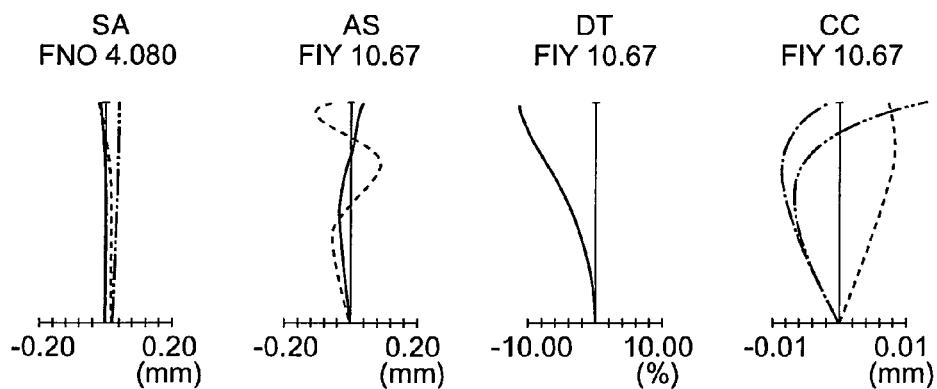
FIGS. 5A, 5B, and 5C are aberration diagrams of the zoom lens according to the second embodiment in the state in which the zoom lens is focused on an object point at infinity.
Figure 5B:
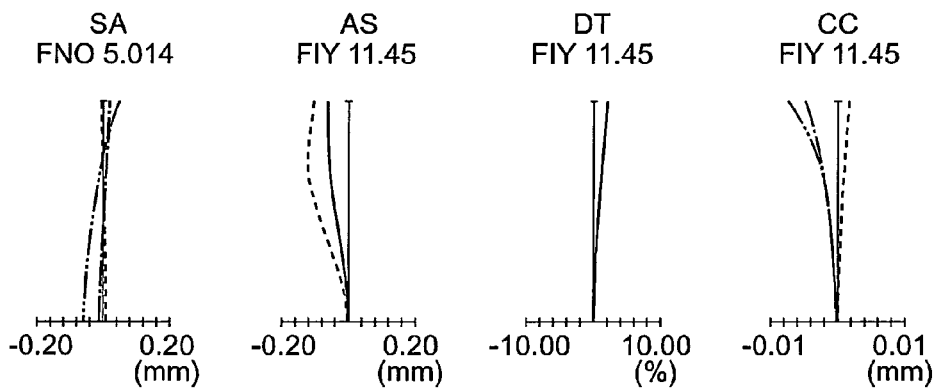
Figure 5C:
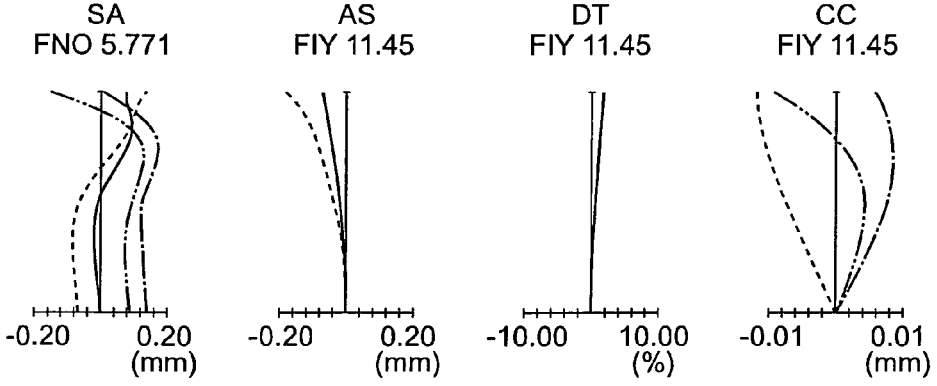
Figure 6A:
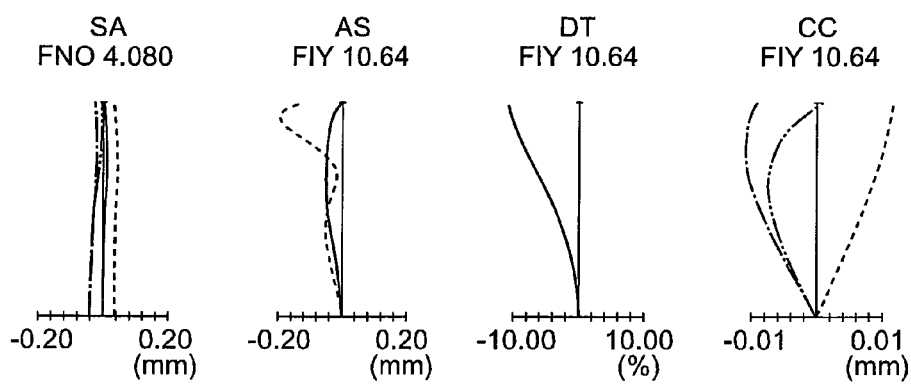
FIGS. 6A, 6B, and 6C are aberration diagrams of the zoom lens according to the third embodiment in the state in which the zoom lens is focused on an object point at infinity.
Figure 6B:
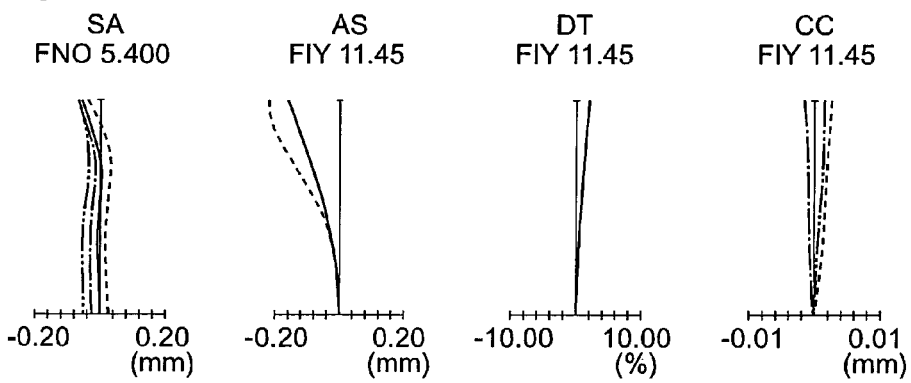
Figure 6C:
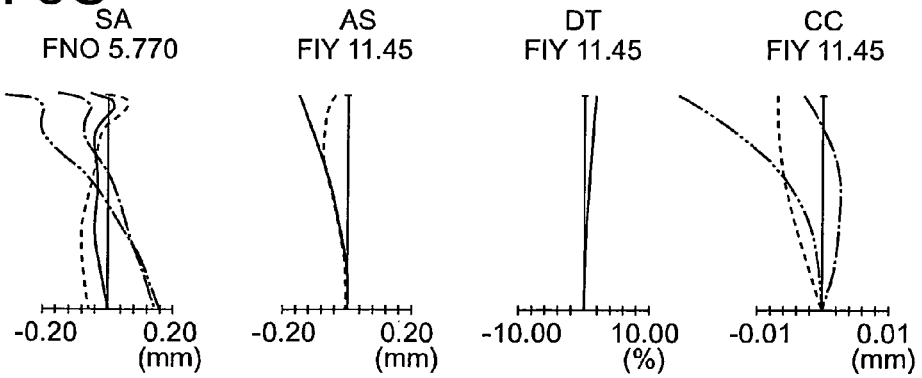

As shown in FIGS. 3A, 3B, and 3C, the zoom lens according to the third embodiment includes, in order from the object side, a first lens unit G1 having a positive refracting power, a second lens unit G2 having a negative refracting power, a third lens unit G3 having a negative refracting power, an aperture stop S, a fourth lens unit G4 having a positive refracting power, and a fifth lens unit G5 having a positive refracting power.

During zooming from the wide angle end to the intermediate focal length state and during zooming from the intermediate focal length state to the telephoto end, the first lens unit G1, the second lens unit G2, the third lens unit G3, the aperture stop S, the fourth lens unit G4, and the fifth lens unit G5 move toward the object side.

The first lens unit G1 is composed of a negative meniscus lens having a convex surface directed toward the object side, a biconvex positive lens, and a positive meniscus lens having a convex surface directed toward the object side. The second lens unit G2 is composed of a negative meniscus lens having a convex surface directed toward the object side, a biconcave negative lens, and a biconvex positive lens. The third lens unit G3 is composed of a cemented lens made up of a biconcave negative lens and a biconvex positive lens. The fourth lens unit G4 is composed of a biconvex positive lens, and a cemented lens made up of a biconvex positive lens and a biconcave negative lens. The fifth lens unit G5 is composed of a biconvex positive lens, and a cemented lens made up of a positive meniscus lens having a convex surface directed toward the image side, a biconcave negative lens, and a biconvex positive lens. The lens elements in each lens unit G1, G2, G3, G4, G5 are arranged in the mentioned order from the object side.

There are six aspheric surfaces, which include both surfaces of the negative meniscus lens in the second lens unit G2, both surfaces of the object side biconvex positive lens in the fourth lens unit G4, and both surfaces of the object side biconvex positive lens in the fifth lens unit G5.

Figure 12A:
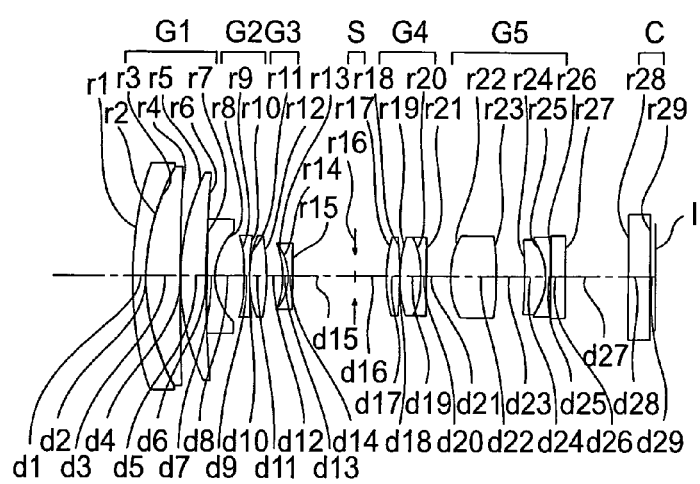
FIGS. 12A, 12B, and 12C are cross sectional views similar to FIGS. 1A, 1B, and 1C showing a zoom lens according to a fourth embodiment of the present invention.
Figure 12B:
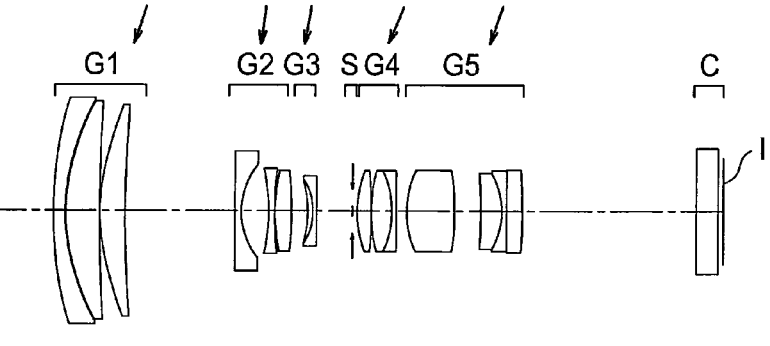
Figure 12C:
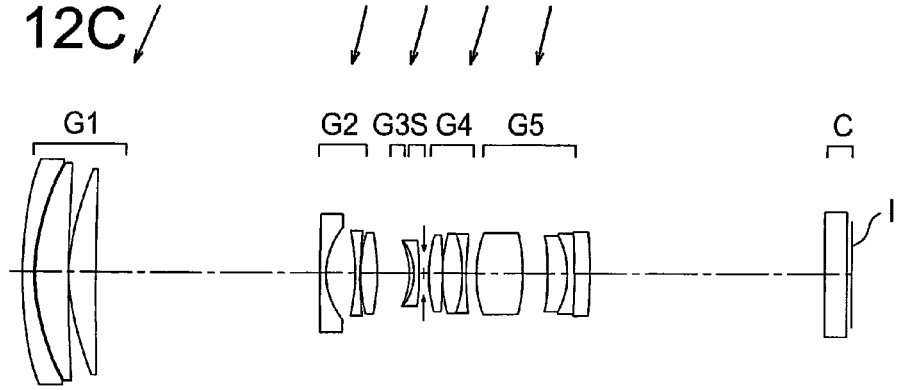
Figure 13A:
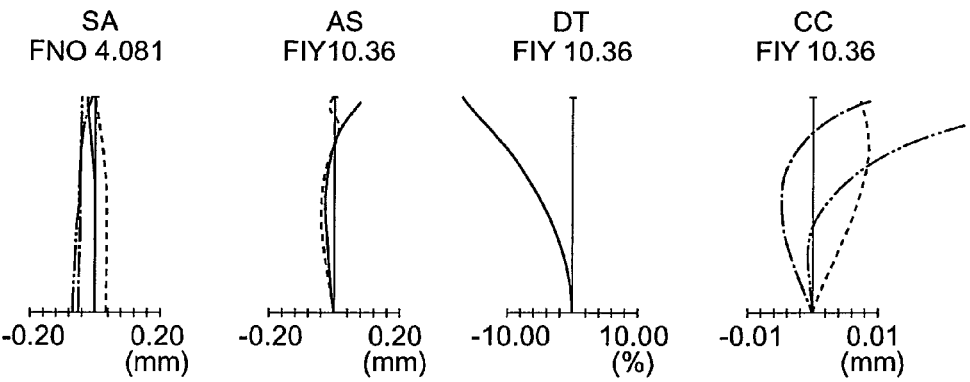
FIGS. 13A, 13B, and 13C are aberration diagrams of the zoom lens according to the fourth embodiment in the state in which the zoom lens is focused on an object point at infinity.
Figure 13B:
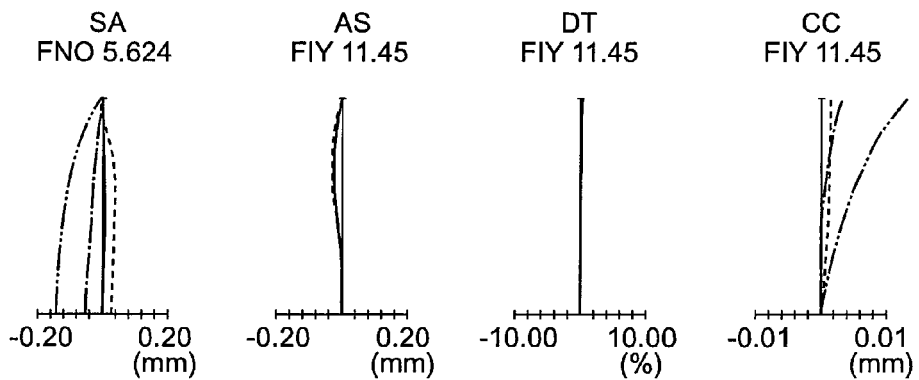
Figure 13C:
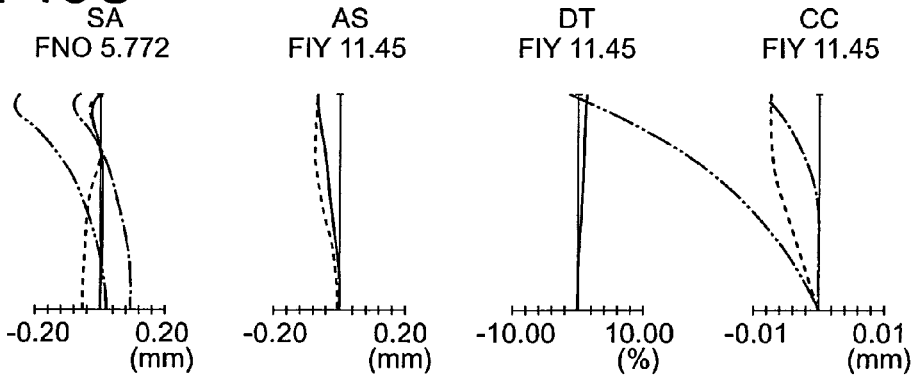

As shown in FIGS. 12A, 12B, and 12C, the zoom lens according to the fourth embodiment includes, in order from the object side, a first lens unit G1 having a positive refracting power, a second lens unit G2 having a negative refracting power, a third lens unit G3 having a negative refracting power, an aperture stop S, a fourth lens unit G4 having a positive refracting power, and a fifth lens unit G5 having a positive refracting power.

During zooming from the wide angle end to the intermediate focal length state and during zooming from the intermediate focal length state to the telephoto end, the first lens unit G1, the second lens unit G2, the third lens unit G3, the aperture stop S, the fourth lens unit G4, and the fifth lens unit G5 move toward the object side.

The first lens unit G1 is composed of a negative meniscus lens having a convex surface directed toward the object side, a positive meniscus lens having a convex surface directed toward the object side, and a positive meniscus lens having a convex surface directed toward the object side. The second lens unit G2 is composed of a biconcave negative lens, a biconcave negative lens, and a biconvex positive lens. The third lens unit G3 is composed of a cemented lens made up of a positive meniscus lens having a convex surface directed toward the image side and a negative meniscus lens having a convex surface directed toward the image side. The fourth lens unit G4 is composed of a biconvex positive lens, and a cemented lens made up of a biconvex positive lens and a biconcave negative lens. The fifth lens unit G5 is composed of a biconvex positive lens, and a cemented lens made up of a positive meniscus lens having a convex surface directed toward the image side, a negative meniscus lens having a convex surface directed toward the image side and a positive meniscus lens having a convex surface directed toward the image side. The lens elements in each lens unit G1, G2, G3, G4, G5 are arranged in the mentioned order from the object side.

There are seven aspheric surfaces, which include both surfaces of the object side biconcave negative lens in the second lens unit G2, the object side surface of the positive meniscus lens in the third lens unit G3, both surfaces of the object side biconvex positive lens in the fourth lens unit G4, and both surfaces of the biconvex positive lens in the fifth lens unit G5.

Numerical data of each embodiment described above is shown below. Apart from symbols described above, f denotes a focal length of the entire zoom lens system, fb denotes a back focus, each of f1, f2, . . . denotes focal length of each lens unit, IH denotes image height, Fno denotes F number, ω denotes a half angle of field, WE denotes a wide angle end, ST denotes an intermediate state, TE denotes a telephoto end, each of r1, r2, . . . denotes radius of curvature of each lens surface, each of d1, d2, . . . denotes a distance between two lenses, each of nd1, nd2, . . . denotes a refractive index of each lens for a d-line (λ=587.6 nm), and each of vd1, vd2, . . . denotes an Abbe constant for each lens. Further, * denotes an aspheric data.

fb (back focus) is a unit which is expressed upon air conversion of a distance from the last lens surface up to a paraxial image plane.

When x is let to be an optical axis with a direction of traveling of light as a positive (direction), and y is let to be in a direction orthogonal to the optical axis, a shape of the aspheric surface is described by the following expression.

$$x=(y^2/r)/[1+\{1-(K+1)(y/r)^2\}^{1/2}]+A_4y^4+A_6y^6+A_8y^8+A_{10}y^{10}+A_{12}y^{12}$$

where, r denotes a paraxial radius of curvature, K denotes a conical coefficient, A4, A6, A8, A10, and A12 denote aspherical surface coefficients of a fourth order, a sixth order, an eight order, a tenth order, and a twelfth order respectively. Moreover, in the aspherical surface coefficients, 'e-n' (where, n is an integral number) indicates '$10^{-n}$'.

Regarding image height in the each of embodiments, barrel distortion that occurs at wide angle positions is corrected electrically, the effective image pickup area is designed to have a barrel shape at the wide angle end. In contrast, barrel distortion that occurs at the intermediate focal length position and at the telephoto end is decreased or pin-cushion distortion occurs.

EXAMPLE 1

| Unit mm Surface data | | | | |
|---|---|---|---|---|
| Surface no. | r | d | nd | vd |
| Object plane | ∞ | ∞ | | |
| 1 | 107.429 | 2.100 | 1.80000 | 29.84 |
| 2 | 51.934 | 0.200 | | |
| 3 | 51.586 | 6.750 | 1.49700 | 81.54 |
| 4 | −350.456 | 0.150 | | |
| 5 | 45.821 | 4.650 | 1.61800 | 63.33 |
| 6 | 139.892 | Variable | | |
| 7* | 92.127 | 1.200 | 1.80476 | 40.87 |
| 8* | 13.098 | 5.100 | | |
| 9 | −27.150 | 0.900 | 1.77250 | 49.60 |
| 10 | 168.754 | 0.150 | | |
| 11 | 25.991 | 3.050 | 1.80518 | 25.42 |
| 12 | −57.701 | Variable | | |
| 13 | −16.073 | 0.900 | 1.78800 | 47.37 |
| 14 | 18.419 | 2.700 | 1.75520 | 27.51 |
| 15 | −94.698 | Variable | | |
| 16(Stop) | ∞ | Variable | | |
| 17* | 20.030 | 4.500 | 1.58313 | 59.38 |
| 18* | −67.433 | 0.150 | | |
| 19 | 16.633 | 3.400 | 1.61800 | 63.33 |
| 20 | −236.437 | 0.900 | 1.90366 | 31.32 |
| 21 | 16.385 | Variable | | |
| 22* | 16.893 | 8.499 | 1.49650 | 81.53 |
| 23* | −21.997 | 6.153 | | |
| 24 | −27.909 | 1.900 | 1.53172 | 48.84 |
| 25 | −16.073 | 1.200 | 1.88300 | 40.76 |
| 26 | 32.284 | 3.000 | 1.69895 | 30.13 |
| 27 | −48.781 | Variable | | |
| 28 | ∞ | 4.082 | 1.51633 | 64.14 |
| 29 | ∞ | 0.745 | | |
| Image plane | ∞ | | | |

Aspherical surface data

7th surface

K = 44.417
A2 = 0.0000E+00, A4 = 4.2031E−05, A6 = −7.4052E−07,
A8 = 7.3001E−09, A10 = −3.6364E−11, A12 = 7.0703E−14

8th surface

K = 0.4167
A2 = 0.0000E+00, A4 = 2.0472E−05, A6 = −8.4199E−07,
A8 = 4.8452E−09, A10 = −1.7103E−11

17th surface

K = 0.0084
A2 = 0.0000E+00, A4 = −2.0286E−05, A6 = 1.7390E−07,
A8 = −2.2692E−09, A10 = 1.9132E−11

18th surface

K = −75.9294
A2 = 0.0000E+00, A4 = −2.2343E−05, A6 = 4.5417E−07,
A8 = −3.2814E−09, A10 = 1.7270E−12, A12 = 2.0758E−13

22nd surface

K = 0.1523
A2 = 0.0000E+00, A4 = −1.1838E−05, A6 = 4.4451E−07,
A8 = 2.5858E−10, A10 = 2.7464E−11

23rd surface

K = −0.7630
A2 = 0.0000E+00, A4 = 6.4571E−05, A6 = 4.9448E−07,
A8 = 6.7260E−10, A10 = 4.8251E−11, A12 = 4.2985E−13

Zoom ratio 10.31
Zoom data(∞)

|  | Wide angle | Inter mediate | Telephoto |
|---|---|---|---|
| Maximum image height (after distortion is corrected) | 10.61 | 11.45 | 11.45 |
| Focal length | 14.29 | 45.79 | 147.28 |
| Fno. | 4.08 | 5.68 | 5.77 |
| Angle of field ω | 40.1 | 13.8 | 4.4 |
| d6 | 0.500 | 21.229 | 46.316 |
| d12 | 2.706 | 2.877 | 6.149 |
| d15 | 12.772 | 5.692 | 1.402 |
| d16 | 5.081 | 2.261 | 0.983 |
| d21 | 6.424 | 2.394 | 1.175 |
| d27 | 11.899 | 32.807 | 42.342 |
| fb (in air) | 15.32 | 36.24 | 45.78 |
| Lens total length | 100.39 | 128.28 | 159.38 |

Unit focal length f1 = 81.45   f2 = −29.73   f3 = −23.78   f4 = 33.60   f5 = 32.55

EXAMPLE 2

Unit mm
Surface data

| Surface no. | r | d | nd | vd |
|---|---|---|---|---|
| Object plane | ∞ | ∞ | | |
| 1 | 75.164 | 2.100 | 1.80000 | 29.84 |
| 2 | 42.751 | 0.200 | | |
| 3 | 41.650 | 7.100 | 1.49700 | 81.54 |
| 4 | −243.697 | 0.150 | | |
| 5 | 40.836 | 3.700 | 1.61800 | 63.33 |
| 6 | 73.404 | Variable | | |
| 7* | 150.882 | 0.100 | 1.52180 | 51.16 |
| 8 | 124.799 | 1.200 | 1.88300 | 40.80 |
| 9 | 12.080 | 4.009 | | |
| 10 | −23.277 | 0.900 | 1.77250 | 49.60 |
| 11 | 33.739 | 0.200 | | |
| 12 | 24.195 | 3.700 | 1.84666 | 23.78 |
| 13 | −24.762 | Variable | | |
| 14 | −15.321 | 0.900 | 1.72916 | 54.68 |
| 15 | −70.585 | Variable | | |
| 16(Stop) | ∞ | Variable | | |
| 17* | 15.867 | 5.000 | 1.59201 | 67.02 |
| 18* | −46.840 | 0.150 | | |
| 19 | 22.584 | 3.700 | 1.61800 | 63.33 |
| 20 | −132.885 | 0.900 | 1.85026 | 32.27 |
| 21 | 15.736 | Variable | | |
| 22* | 15.981 | 5.500 | 1.49700 | 81.54 |
| 23* | −18.389 | 0.200 | | |
| 24 | −93.625 | 7.121 | 1.53172 | 48.84 |
| 25 | −10.087 | 1.200 | 1.83481 | 42.71 |
| 26 | 14.591 | 4.000 | 1.71736 | 29.52 |
| 27 | −180.484 | Variable | | |
| 28 | ∞ | 4.082 | 1.51633 | 64.14 |
| 29 | ∞ | 0.745 | | |
| Image plane | ∞ | | | |

Aspherical surface data

7th surface

K = 0
A2 = 0.0000E+00, A4 = 2.6448E−05, A6 = −4.4129E−07,
A8 = 4.8858E−09, A10 = −1.8849E−11

17th surface

K = −0.6889
A2 = 0.0000E+00, A4 = −2.1087E−05, A6 = 1.2141E−07,
A8 = 9.1046E−12, A10 = −4.2408E−14

18th surface

K = −12.3523
A2 = 0.0000E+00, A4 = −6.3481E−06, A6 = 1.7798E−07,
A8 = 1.1496E−11, A10 = 1.1345E−13

22th surface

K = 0
A2 = 0.0000E+00, A4 = −2.1321E−05, A6 = 7.3064E−08,
A8 = 1.0360E−11, A10 = 1.0706E−13

23th surface

K = 0
A2 = 0.0000E+00, A4 = 4.1435E−05, A6 = −4.2885E−08,
A8 = −1.1561E−11, A10 = −1.0680E−13

Zoom ratio 10.29
Zoom data(∞)

|  | Wide angle | Inter mediate | Telephoto |
|---|---|---|---|
| Maximum image height (after distortion is corrected) | 10.67 | 11.45 | 11.45 |
| Focal length | 14.28 | 45.73 | 147.01 |
| Fno. | 4.08 | 5.01 | 5.77 |
| Angle of field ω | 40.2 | 13.7 | 4.4 |
| d6 | 0.500 | 23.464 | 42.341 |
| d13 | 2.143 | 2.672 | 4.960 |
| d15 | 14.915 | 6.807 | 1.588 |
| d16 | 3.121 | 1.808 | 1.200 |
| d21 | 7.972 | 3.145 | 0.810 |
| d27 | 13.311 | 31.519 | 50.022 |
| fb (in air) | 16.75 | 34.96 | 53.46 |
| Lens total length | 97.43 | 124.88 | 156.39 |

Unit focal length f1 = 77.81   f2 = −25.53   f3 = −27.02   f4 = 28.82   f5 = 35.71

EXAMPLE 3

Unit mm
Surface data

| Surface no. | r | d | nd | vd |
|---|---|---|---|---|
| Object plane | ∞ | ∞ | | |
| 1 | 83.516 | 2.100 | 1.85026 | 32.27 |
| 2 | 48.916 | 0.200 | | |
| 3 | 48.393 | 7.407 | 1.49700 | 81.54 |
| 4 | −396.980 | 0.150 | | |
| 5 | 44.354 | 4.563 | 1.49700 | 81.54 |
| 6 | 124.506 | Variable | | |
| 7* | 126.154 | 1.200 | 1.80476 | 40.87 |
| 8* | 12.367 | 5.110 | | |
| 9 | −26.275 | 0.900 | 1.83481 | 42.71 |
| 10 | 1342.002 | 0.150 | | |
| 11 | 27.248 | 3.569 | 1.80518 | 25.42 |
| 12 | −33.488 | Variable | | |
| 13 | −16.594 | 0.900 | 1.78800 | 47.37 |
| 14 | 32.583 | 1.908 | 1.75520 | 27.51 |
| 15 | −119.383 | Variable | | |
| 16(Stop) | ∞ | Variable | | |
| 17* | 18.595 | 4.521 | 1.58313 | 59.38 |
| 18* | −76.713 | 0.150 | | |
| 19 | 18.614 | 3.194 | 1.61800 | 63.33 |
| 20 | −650.182 | 0.900 | 1.90366 | 31.32 |
| 21 | 17.356 | Variable | | |
| 22* | 17.671 | 8.230 | 1.49650 | 81.53 |
| 23* | −19.300 | 5.169 | | |
| 24 | −20.763 | 2.334 | 1.58144 | 40.75 |
| 25 | −13.525 | 1.200 | 1.88300 | 40.76 |
| 26 | 49.761 | 3.135 | 1.68893 | 31.07 |
| 27 | −39.408 | Variable | | |

-continued

| | | | | |
|---|---|---|---|---|
| 28 | ∞ | 4.082 | 1.51633 | 64.14 |
| 29 | ∞ | 0.745 | | |
| Image plane | ∞ | | | |

Aspherical surface data

7th surface

K = 18.1311
A2 = 0.0000E+00, A4 = 3.2422E−05, A6 = −4.0541E−07,
A8 = 3.7525E−09, A10 = −1.7137E−11, A12 = 3.2072E−14

8th surface

K = 0.204
A2 = 0.0000E+00, A4 = 9.2398E−06, A6 = −5.4202E−07,
A8 = 4.4512E−09E, A10 = −3.5394E−11

17th surface

K = −0.5447
A2 = 0.0000E+00, A4 = −1.5390E−05, A6 = 9.4736E−08,
A8 = 2.8325E−10, A10 = −3.1053E−11

18th surface

K = −27.1957
A2 = 0.0000E+00, A4 = −9.3004E−07, A6 = 2.7346E−07,
A8 = −4.2851E−09, A10 = 5.8264E−11, A12 = −7.3895E−13

22nd surface

K = 0.2126
A2 = 0.0000E+00, A4 = −1.1506E−05, A6 = 4.9249E−07,
A8 = 8.1270E−10, A10 = 2.7368E−11

23rd surface

K = −0.7278
A2 = 0.0000E+00, A4 = 5.6357E−05, A6 = 5.9386E−07,
A8 = −3.6693E−09, A10 = 1.5914E−10, A12 = −3.7147E−13

Zoom ratio 10.27
Zoom data(∞)

| | Wide angle | Inter mediate | Telephoto |
|---|---|---|---|
| Maximum image height (after distortion is corrected) | 10.64 | 11.45 | 11.45 |
| Focal length | 14.30 | 45.90 | 146.90 |
| Fno. | 4.08 | 5.40 | 5.77 |
| Angle of field ω | 39.8 | 13.7 | 4.4 |
| d6 | 0.516 | 25.224 | 47.998 |
| d12 | 1.963 | 2.863 | 6.211 |
| d15 | 13.677 | 7.457 | 1.312 |
| d16 | 6.224 | 1.269 | 0.806 |
| d21 | 5.716 | 2.403 | 1.187 |
| d27 | 11.903 | 29.995 | 43.288 |
| fb (in air) | 15.41 | 33.43 | 46.75 |
| Lens total length | 100.50 | 129.64 | 161.25 |

Unit focal length f1 = 86.26   f2 = −40.44   f3 = −23.98   f4 = 33.82   f5 = 35.87

EXAMPLE 4

Unit mm
Surface data

| Surface no. | r | d | nd | vd |
|---|---|---|---|---|
| Object plane | ∞ | ∞ | | |
| 1 | 74.620 | 2.100 | 1.80000 | 29.84 |
| 2 | 41.749 | 0.300 | | |
| 3 | 41.516 | 6.642 | 1.49700 | 81.54 |
| 4 | 357.858 | 0.150 | | |
| 5 | 48.919 | 4.928 | 1.61800 | 63.33 |
| 6 | 288.911 | Variable | | |
| 7* | −687.605 | 1.200 | 1.80610 | 40.73 |
| 8* | 13.978 | 5.490 | | |
| 9 | −38.251 | 0.900 | 1.80610 | 40.92 |
| 10 | 50.487 | 0.150 | | |
| 11 | 25.234 | 3.451 | 1.80518 | 25.42 |
| 12 | −34.368 | Variable | | |
| 13* | −16.987 | 0.911 | 1.63387 | 23.38 |
| 14 | −11.641 | 0.864 | 1.69680 | 55.53 |
| 15 | −1425.555 | Variable | | |
| 16(Stop) | ∞ | Variable | | |
| 17* | 24.015 | 2.520 | 1.58913 | 61.25 |
| 18* | −327.819 | 0.150 | | |
| 19 | 29.859 | 4.052 | 1.61800 | 63.33 |
| 20 | −22.743 | 0.900 | 1.90366 | 31.32 |
| 21 | 422.915 | Variable | | |
| 22* | 23.854 | 9.073 | 1.49700 | 81.61 |
| 23* | −25.920 | 5.380 | | |
| 24 | −34.428 | 3.800 | 1.53172 | 48.84 |
| 25 | −15.901 | 1.200 | 1.88300 | 40.76 |
| 26 | −144.231 | 2.935 | 1.69895 | 30.13 |
| 27 | −81.437 | Variable | | |
| 28 | ∞ | 4.082 | 1.51633 | 64.14 |
| 29 | ∞ | 0.745 | | |
| Image plane | ∞ | | | |

Aspherical surface data

7th surface

K = 3235.1533
A2 = 0.0000E+00, A4 = 1.8428E−05, A6 = −1.5457E−07,
A8 = 5.6997E−10, A10 = 0.0000E+00

8th surface

K = −0.6354
A2 = 0.0000E+00, A4 = 3.6636E−05, A6 = 3.6458E−08,
A8 = −1.2442E−09, A10 = 0.0000E+00

13th surface

K = 0
A2 = 0.0000E+00, A4 = 3.9388E−06, A6 = 0.0000E+00,
A8 = 0.0000E+00, A10 = 0.0000E+00, A12 = 0.0000E+00

17th surface

K = −0.9165
A2 = 0.0000E+00, A4 = 4.5973E−06, A6 = −3.8380E−07,
A8 = 8.5088E−09, A10 = −1.2945E−10, A12 = 0.0000E+00

18th surface

K = −9.2369
A2 = 0.0000E+00, A4 = 1.1379E−05, A6 = −3.8827E−07,
A8 = 8.8057E−09, A10 = −1.3497E−10, A12 = 0.0000E+00

22nd surface

K = 3.1312
A2 = 0.0000E+00, A4 = −3.4607E−06, A6 = 2.0058E−07,
A8 = 1.7243E−09, A10 = −1.3414E−11, A12 = 0.0000E+00

23ed surface

K = −0.8316
A2 = 0.0000E+00, A4 = 9.4968E−05, A6 = 4.9184E−07,
A8 = 1.8106E−09, A10 = 5.0322E−11, A12 = 0.0000E+00

Zoom ratio 10.29
Zoom data(∞)

| | Wide angle | Inter mediate | Telephoto |
|---|---|---|---|
| Maximum image height (after distortion is corrected) | 10.37 | 11.45 | 11.45 |
| Focal length | 14.29 | 46.02 | 147.01 |
| Fno. | 4.08 | 5.62 | 5.77 |
| Angle of field ω | 41.1 | 13.9 | 4.4 |
| d6 | 0.600 | 21.258 | 44.066 |
| d12 | 3.146 | 2.963 | 5.955 |
| d15 | 12.380 | 6.945 | 1.150 |
| d16 | 5.979 | 0.970 | 0.800 |
| d21 | 5.036 | 2.189 | 1.494 |
| d27 | 12.617 | 33.744 | 45.838 |

-continued

| fb(in air) | 16.05 | 37.18 | 49.27 |
|---|---|---|---|
| Lens total length | 100.29 | 128.60 | 159.84 |

| Unit focal length | | | | |
|---|---|---|---|---|
| f1 = 79.32 | f2 = −34.28 | f3 = −23.63 | f4 = 29.64 | f5 = 51.22 |

FIGS. 4A to 4C, 5A to 5C, 6A to 6C, and 13A to 13C are aberration diagrams of the zoom lenses according to the first to the fourth embodiments in the state in which the zoom lenses are focused on an object point at infinity. These aberration diagrams show spherical aberration (SA), astigmatism (AS), distortion (DT), and chromatic aberration of magnification (CC) respectively at the wide angle end (FIGS. 4A, 5A, 6A, and 13A, in the intermediate focal length state (FIGS. 4B, 5B, 6B, and 13B), and at the telephoto end (FIGS. 4C, 5C, 6C, and 13C. In these diagrams, FIY represents the maximum image height.

Values of each conditional expression are shown below:

$$f1/(fw \times fT)^{1/2} \quad (1)$$

$$f2/f3 \quad (2)$$

$$\nu p1 \quad (3)$$

$$\theta n1g,F \quad (4)$$

$$|f5cem|/fw \quad (5)$$

$$ft/fw \quad (A)$$

$$|f1/f3| \quad (B)$$

$$dD45/ft \quad (C)$$

$$M3/dD12 \quad (D)$$

| | Conditional expression | | | | |
|---|---|---|---|---|---|
| | (1) | (2) | (3) | (4) | (5) |
| Example 1 | 1.776 | 1.250 | 72.44 | 0.602 | 2.246 |
| Example 2 | 1.698 | 0.945 | 72.44 | 0.602 | 1.734 |
| Example 3 | 1.882 | 1.687 | 81.54 | 0.593 | 2.008 |

| | Conditional expression | | | |
|---|---|---|---|---|
| | (A) | (B) | (C) | (D) |
| Example 1 | 10.31 | 3.426 | 0.0356 | 2.825 |
| Example 2 | 10.29 | 2.880 | 0.0487 | 5.077 |
| Example 3 | 10.27 | 3.597 | 0.0308 | 2.136 |

| | Conditional expression | | | | |
|---|---|---|---|---|---|
| | (1) | (2) | (3) | (4) | (5) |
| Example 4 | 1.731 | 1.451 | 72.44 | 0.602 | 2.558 |

| | Conditional expression | | | |
|---|---|---|---|---|
| | (A) | (B) | (C) | (D) |
| Example 4 | 10.29 | 3.357 | 0.0241 | 0.212 |

(Correction of Distortion)

Incidentally, when the zoom lens system of the present invention is used, a digital correction of distortion of an image is carried out electrically. A basic concept for the digital correction of the distortion of an image will be described below.

Figure 7:
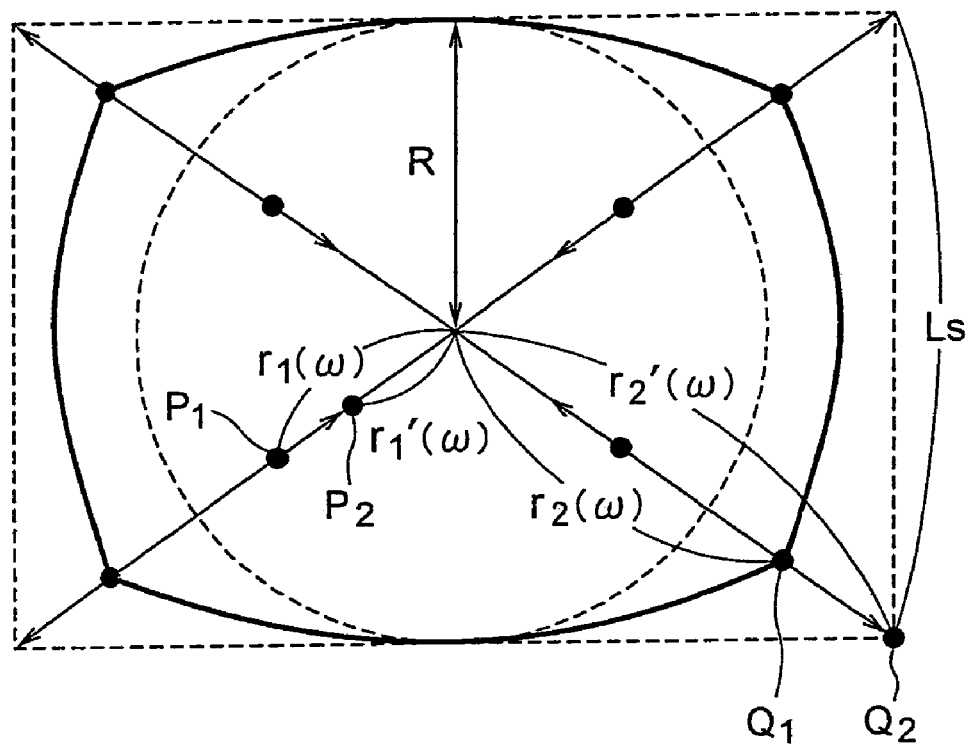
FIG. 7 is a diagram illustrating correction of distortion.

For example, as shown in FIG. 7, with a point of intersection of an optical axis and an image pickup plane to be a center, a magnification on a circumference (image height) of a circle of radius R making a contact internally with a longer side of an effective image pickup plane is fixed, and this circumference is let to be a base reference for the correction. Next, each point on a circumference (image height) of an arbitrary radius r(ω) other than the radius R is moved in a substantial direction of radiation, and the correction is carried out by moving on a concentric circle such that the radius becomes r'(ω).

For example, in FIG. 7, a point $P_1$ on a circumference of an arbitrary radius $r_1(\omega)$ positioned at an inner side of a circle of radius R is moved to a point $P_2$ on a circumference of a radius $r_1'(\omega)$ which is to be corrected, directed toward a center of the circle. Moreover, a point $Q_1$ on a circumference of an arbitrary radius $r_2(\omega)$ positioned at an outer side of the circle of radius R is moved to a point $Q_2$ on a circumference of a radius $r_2'(\omega)$ which is to be corrected, directed toward a direction away from the center of the circle.

Here, r'(ω) can be expressed as follows.

$$r'(\omega) = \alpha \cdot f \tan \omega \quad (0 \leq \alpha \leq 1)$$

where, ω is a half angle of field of an object and f is a focal length of an imaging optical system (the zoom lens system in the present invention).

Here, when an ideal image height corresponding to a circle (image height) of radius R is let to be Y, then $$\alpha = R/Y = R/(f \tan \omega).$$

The optical system, ideally, is rotationally symmetric with respect to an optical axis. In other words, the distortion also occurs in a rotationally symmetric manner with respect to the optical axis. Consequently, as it has been described above, in a case of correcting electrically the optical distortion, when it is possible to carry out correction by fixing a magnification on a circumference (image height) of the circle of radius R making a contact internally with a longer side of the effective image pickup plane, with a point of intersection of an optical axis on a reproduced image, and an image pickup plane to be a center, and moving each point on the circumference (image height) of radius r(ω) other than the radius R in a substantial direction of radiation, and moving on a concentric circle such that the radius becomes r'(ω), it can be considered to be advantageous from a point of amount of data and amount of calculation.

Incidentally, an optical image ceases to be a continuous amount at a point of time when an image is picked up by an electronic image pickup element (due to sampling). Consequently, the circle of radius R which is drawn exactly on the optical image ceases to be an accurate circle as long as pixels on the electronic image pickup element are not arranged radially.

In other words, regarding a shape correction of image data expressed for each discrete coordinate point, a circle which can fix the magnification does not exist. Therefore, for each pixel (Xi, Yj), a method of determining coordinates of a destination of movement (Xi', Yj') may be used. When two or more points (Xi, Yj) have moved to the coordinates (Xi', Yj'), an average of values of each pixel is taken. Moreover, when there is no point which has moved, interpolation may be performed by using a value of coordinate (Xi', Yj') of some of the surrounding pixels.

Such method is effective for correction when the distortion with respect to the optical axis is remarkable due to a manufacturing error etc. of the optical system or the electronic image pickup element, in the electronic image pickup apparatus having the zoom lens system in particular, and when the circle of the radius R drawn on the optical image is asymmetric. Moreover, it is effective for correction when there occurs to be a geometric distortion at the time of reproducing a signal to an image in an image pickup element or various output devices.

In the electronic image pickup apparatus of the present invention, for calculating a correction amount $r'(\omega)-r(\omega)$, an arrangement may be made such that a relationship between $r(\omega)$, in other words, half angle of field and the image height, or a relationship between a real image height r and an ideal image height $r'/\alpha$ is recorded in a recording medium which is built-in in the electronic image pickup apparatus.

For an image after the distortion correction, not to have an extreme shortage of an amount of light at both ends in a direction of short side, the radius R may satisfy the following conditional expression.

$$0 \leq R \leq 0.6\, Ls$$

where, Ls is a length of a short side of the effective image pickup surface.

It is preferable that the radius R satisfies the following conditional expression.

$$0.3 \leq Ls \leq R \leq 0.6\, Ls$$

Furthermore, it is most advantageous to match the radius R with a radius of a circle making an internal contact in a short side direction of a substantially effective image pickup plane. In a case of correction in which, the magnification is fixed near the radius R=0, in other words, near on the axis, it is somewhat disadvantageous from an aspect of substantial number of images, but it is possible to secure an effect for making the size small even when the angle is widened.

A focal length interval which requires a correction is divided into a number of focal point zones. Moreover, the correction may be carried out with the amount of correction as in a case in which, a correction result which satisfies substantially the following relationship $$r'(\omega)=\alpha \cdot f \tan \omega$$

near a telephoto end in the focal point zones which are divided.

However, in this case, at a wide angle end in the focal point zones which are divided, a barrel-shape distortion at the wide angel end of the focal point zones which are divided is remained to some extent. Moreover, when the number of divided zones is increased, there arises a need to hold specific data necessary for correction, additionally in a recording medium. Therefore it is not preferable to increase the number of divided zones. Therefore, one or a plurality of coefficients associated with each focal length in the focal point zones which are divided, are calculated in advance. The coefficients may be determined based on a measurement by simulation or by actual equipment.

An amount of correction in a case in which, the correction result which satisfies substantially the following relationship $$r'(\omega)=\alpha \cdot f \tan \omega$$

near the telephoto end in the focal point zones which are divided may be calculated, and may let to be a final amount of correction by multiplying uniformly the coefficient for each focal length with respect to this amount of correction.

Incidentally, when there is no distortion in an image achieved by imaging (forming an image) of an infinite object, the following relationship $$f=y/\tan \omega$$

holds.

Here, y denotes a height (image height) of an image point from the optical axis, f denotes a focal length of an imaging system (zoom lens system in the present invention), and ω denotes an angle (object half angle of field) with respect to the optical axis in an object point direction corresponding to image points connecting from a center on an image pickup plane up to a position of y.

When there is a barrel-shape distortion in the imaging system, the relationship becomes $$f>y/\tan \omega.$$

In other words, when the focal length f of the imaging system, and the image height y are let to be fixed, a value of ω becomes large.

(Digital Camera)

Figure 8:
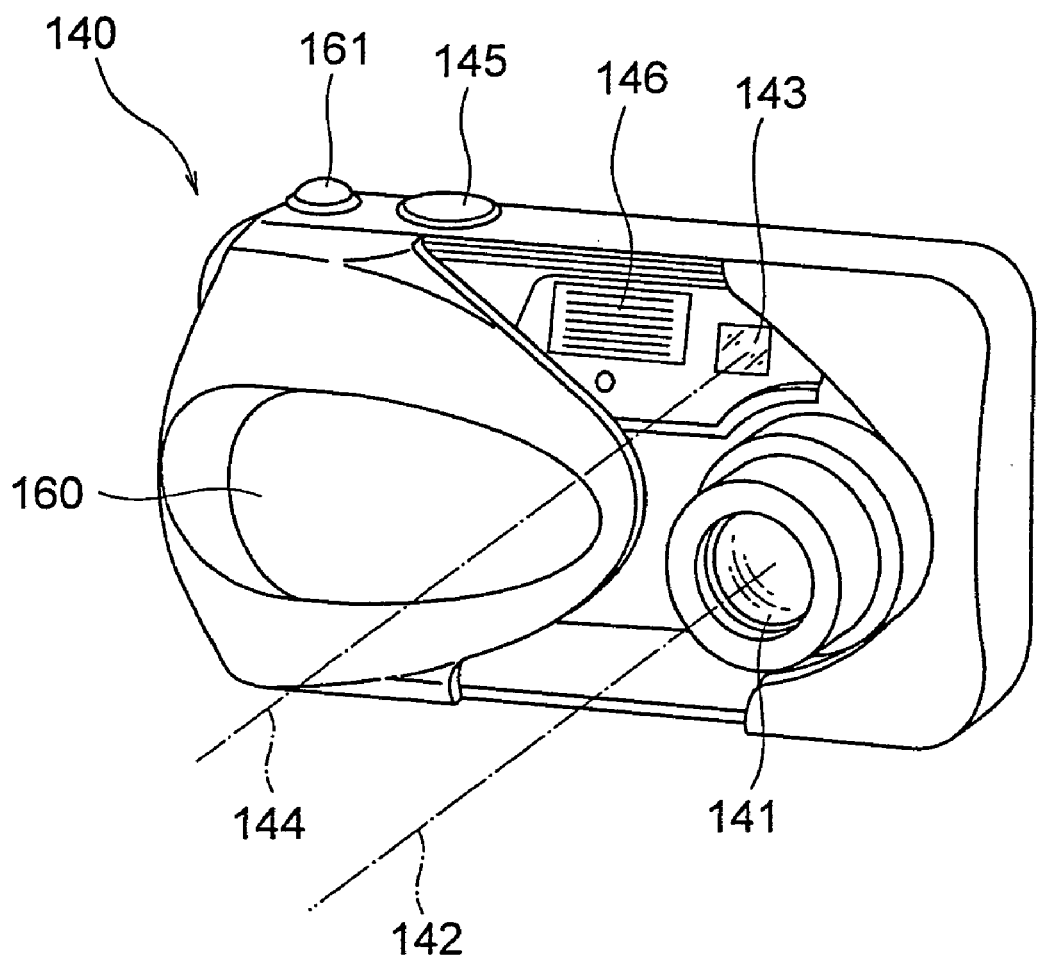
FIG. 8 is a front perspective view showing an outer appearance of a digital camera equipped with a zoom lens according to the present invention.
Figure 9:
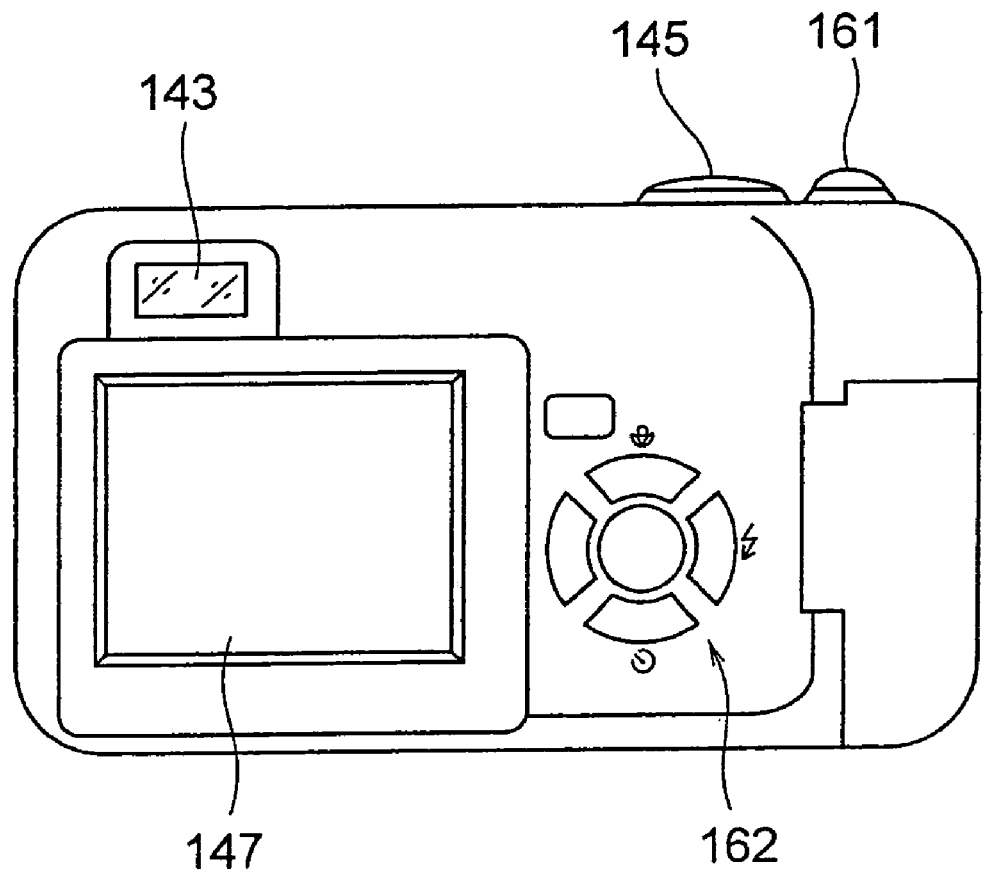
FIG. 9 is a rear perspective view of the digital camera.
Figure 10:
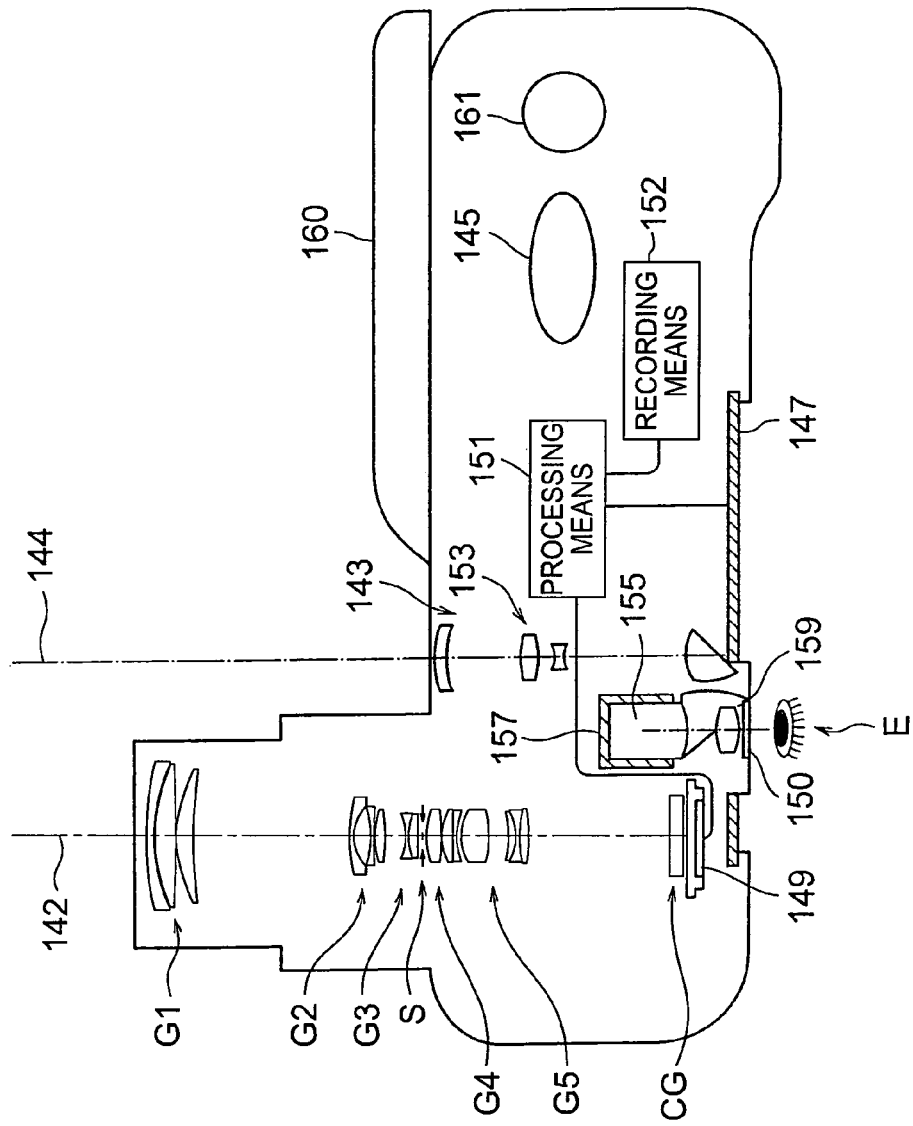
FIG. 10 is a cross sectional view of the digital camera.

FIG. 8 to FIG. 10 are conceptual diagrams of a structure of a digital camera according to the present invention in which a zoom lens system described above is incorporated in a taking optical system 141. FIG. 8 is a front perspective view showing an appearance of a digital camera 140, FIG. 9 is a rear view of the same, and FIG. 10 is a schematic cross-sectional view showing a structure of the digital camera 140. In FIG. 8 and FIG. 10, show an uncollapsed state of the taking optical system 141. The digital camera 140, in a case of this example, includes the taking optical system 141 having a taking optical path 142, a finder optical system 143 having a finder optical path 144, a shutter button 145, a flash 146, a liquid-crystal display monitor 147, a focal-length changing button 161, and a setting changing switch 162 etc., and in the uncollapsed state of the taking optical system 141, by sliding a cover 160, the taking optical system 141, the finder optical system 143, and the flash 146 are covered by the cover 160. Further, when the cover 160 is opened and the digital camera is set in a photo taking state, the taking optical system 141 assumes the uncollapsed state as shown in FIG. 8, when the shutter button 145 disposed on an upper portion of the digital camera 140 is pressed, in synchronization with the pressing of the shutter button 145, a photograph is taken by the taking optical system 141 such as the zoom lens system in the first embodiment. An object image formed by the taking optical system 141 is formed on an image pickup surface of a CCD 149 via a cover glass C and a low pass filter on which a wavelength region restricting coating is applied. An object image which is received as light by the CCD 149 is displayed on the liquid-crystal display monitor 147 which is provided on a rear surface of the digital camera 140 as an electronic image, via a processing means 151. Moreover, a recording means 152 is connected to the processing means 151, and it is also possible to record the electronic image which is taken. The recording means 152 may be provided separately from the processing means 151, or may be formed by recording by writing electronically in a flexible disc, a memory card, or an MO etc.

Moreover, the camera may be formed as a silver-salt camera in which a silver-salt film is disposed instead of the CCD 149.

Furthermore, a finder objective optical system 153 is disposed on the finder optical path 144. The finder objective optical system 153 consists of a plurality of lens units (three units in the diagram), and two prisms, and is made of a zoom optical system in which a focal length changes in synchronization with a zoom lens system of the taking optical system 141. An object image formed by the finder objective optical system 153 is formed on a field frame 157 of an erecting prism 155 which is an image erecting member. On a rear side of the erecting prism 155, an eyepiece optical system 159 which guides an erected image to a viewer's eyeball, is disposed. A cover member 150 is disposed on an emergence side of the eyepiece optical system 159.

Since the digital camera 140 structured in such manner has the taking optical system 141 according to the present invention, has an extremely small thickness in collapsed state, and an extremely stable imaging performance in the entire zooming region at high magnification, it is possible to realize a high-performance, a small size, and a widening of angle of field.

Further, it could be structured that the zoom lens is detachable from the main body of camera having an image pickup device, therefore, the zoom lens could be interchangeable lenses.

Recently, other than the single-lens reflex camera having a quick return mirror in the main body of camera, it is popular an camera with interchangeable lenses which does not have the quick return mirror. The above-mentioned zoom lens in each embodiment has a proper short back focus. Therefore, it is prefer that the zoom lens of the above embodiments could be used as interchangeable lenses for the camera which does not have the quick return mirror.

(Internal Circuit Structure)

FIG. 11 is a structural block diagram of an internal circuit of main components of the digital camera 140. In the following description, the processing means 151 described above includes for instance, a CDS/ADC section 124, a temporary storage memory 117, and an image processing section 118, and a storage means 152 consists of a storage medium section 119 for example.

As shown in FIG. 11, the digital camera 140 includes an operating section 112, a control section 113 which is connected to the operating section 112, the temporary storage memory 117 and an imaging drive circuit 116 which are connected to a control-signal output port of the control section 113, via a bus 114 and a bus 115, the image processing section 118, the storage medium section 119, a display section 120, and a set-information storage memory section 121.

The temporary storage memory 117, the image processing section 118, the storage medium section 119, the display section 120, and the set-information storage memory section 121 are structured to be capable of mutually inputting and outputting data via a bus 122. Moreover, the CCD 149 and the CDS/ADC section 124 are connected to the imaging drive circuit 116.

The operating section 112 includes various input buttons and switches, and is a circuit which informs the control section, event information which is input from outside (by a user of the digital camera) via these input buttons and switches.

The control section 113 is a central processing unit (CPU), and has a built-in computer program memory which is not shown in the diagram. The control section 113 is a circuit which controls the entire digital camera 140 upon receiving instructions and commands input by the user of the camera via the operating section 112, according to a computer program stored in this computer program memory.

The CCD 149 receives as light an object image which is formed via the taking optical system 141 according to the present invention. The CCD 149 is an image pickup element which is driven and controlled by the imaging drive circuit 116, and which converts an amount of light for each pixel of the object image to an electric signal, and outputs to the CDS/ADC section 124.

The CDS/ADC section 124 is a circuit which amplifies the electric signal which is input from the CCD 149, and carries out analog/digital conversion, and outputs to the temporary storage memory 117 image raw data (bare data, hereinafter called as 'RAW data') which is only amplified and converted to digital data.

The temporary storage memory 117 is a buffer which includes an SDRAM (Synchronous Dynamic Random Access Memory) for example, and is a memory device which stores temporarily the RAW data which is output from the CDS/ADC section 124. The image processing section 118 is a circuit which reads the RAW data stored in the temporary storage memory 117, or the RAW data stored in the storage medium section 119, and carries out electrically various image-processing including the distortion correction, based on image-quality parameters specified by the control section 113.

The storage medium section 119 is a recording medium in the form of a card or a stick including a flash memory for instance, detachably mounted. The storage medium section 119 is a control circuit of a device in which, the RAW data transferred from the temporary storage memory 117 and image data subjected to image processing in the image processing section 118 are recorded and maintained in the card flash memory and the stick flash memory.

The display section 120 includes the liquid-crystal display monitor, and is a circuit which displays images and operation menu on the liquid-crystal display monitor. The set-information storage memory section 121 includes a ROM section in which various image quality parameters are stored in advance, and a RAM section which stores image quality parameters which are selected by an input operation on the operating section 112, from among the image quality parameters which are read from the ROM section. The set-information storage memory section 121 is a circuit which controls an input to and an output from the memories.

The digital camera 140 structured in such manner has the taking optical system 141, according to the present invention, which, while having a sufficient wide angle region, and a compact structure, has an extremely stable imaging performance in the entire magnification region at a high magnification. Therefore, it is possible to realize the high performance, the small size, and widening of the angle. Moreover, a prompt focusing operation at the wide angle side and the telephoto side is possible.

As described in the foregoing, the present invention can suitably applied to zoom lenses that are short in overall length at the wide angle end and can easily be designed to have a high zoom ratio while having an adequate angle of view at the wide angle end.

The present invention can provide a zoom lens that is short in overall length at the wide angle end and can easily be designed to have a high zoom ratio while having an adequate angle of view at the wide angle end.

Furthermore, the present invention can provide a zoom lens that is advantageous in achieving good performance.

The present invention can also provide an image pickup apparatus equipped with such a zoom lens.

What is claimed is:

1. A zoom lens comprising, in order from an object side to an image side:
a first lens unit having a positive refracting power;
a second lens unit having a negative refracting power;
a third lens unit having a negative refracting power;
a fourth lens unit having a positive refracting power; and
a fifth lens unit having a positive refracting power,
wherein during zooming from the wide angle end to the telephoto end, the first lens unit, the second lens unit, the third lens unit, and the fourth lens unit move in such a way that they are each located closer to the object side at the telephoto end than at the wide angle end, a distance between the first lens unit and the second lens unit is larger at the telephoto end than at the wide angle end, a distance between the second lens unit and the third lens unit is larger at the telephoto end than at the wide angle end, a distance between the third lens unit and the fourth lens unit is smaller at the telephoto end than at the wide angle end, and a distance between the fourth lens unit and the fifth lens unit is changed for the zooming, and the zoom lens satisfies the following conditions:

$$1.5 \leq f_1/(f_w \cdot f_T)^{1/2} \leq 2.1 \quad (1) \text{ and}$$

$$0.9 \leq f_2/f_3 \leq 1.7 \quad (2),$$

where $f_1$ is the focal length of the first lens unit, $f_2$ is the focal length of the second lens unit, $f_3$ is the focal length of the third lens unit, $f_w$ is the focal length of the entire zoom lens system at the wide angle end, and $f_T$ is the focal length of the entire zoom lens system at the telephoto end.

2. The zoom lens according to claim 1, wherein the zoom lens satisfies the following condition:

$$7 < ft/fw < 30 \quad (A).$$

3. The zoom lens according to claim 1, wherein the zoom lens satisfies the following condition:

$$2.7 < |f1/f3| < 5.5 \quad (B).$$

4. The zoom lens according to claim 1, wherein the first lens unit comprises at least two positive lenses and satisfies the following condition:

$$vp1 \geq 65.00 \quad (3),$$

where vp1 is the average of the Abbe constants of all the positive lens elements in the first lens unit with respect to the d-line.

5. The zoom lens according to claim 1, wherein the first lens unit comprises at least one negative lens element that satisfies the following condition:

$$\theta n1g,F \leq 0.610 \quad (4),$$

where θn1g,F is the relative partial dispersion of the negative lens element in the first lens unit with respect to the g-line and the F-line.

6. The zoom lens according to claim 1, wherein the zoom lens comprises an aperture stop that is disposed between the third lens unit and the fourth lens unit, and the distance between the aperture stop and the fourth lens unit on the optical axis is smaller at the telephoto end than at the wide angle end.

7. The zoom lens according to claim 1, wherein the zoom lens comprises a fifth lens unit having a positive refracting power disposed closer to the image side of the fourth lens unit, and each of the second, fourth, and fifth lens units has at least one aspheric surface.

8. The zoom lens according to claim 1, wherein during zooming from the wide angle end to the telephoto end, the first lens unit, the second lens unit, the third lens unit, and the fourth lens unit move only toward the object side.

9. The zoom lens according to claim 1, wherein the second lens unit and the third lens unit move in such a way that the following condition is satisfied:

$$0 < M3/dD12 < 10 \quad (D),$$

where M3 is the amount of movement of the third lens unit with zooming from the wide angle end to the telephoto end with movement toward the object side being represented by a positive value, and dD12 is a increase in the distance between the second lens unit and the third lens unit with zooming from the wide angle end to the telephoto end.

10. An image pickup apparatus comprising:
a zoom lens according to claim 1; and
an image pickup element that is disposed on the image side of the zoom lens and converts an optical image formed by the zoom lens into an electrical signal.

11. The zoom lens according to claim 1, wherein during focusing from an object at a long distance to an object at a short distance, only the third lens unit is moved toward the object side.

12. The zoom lens according to claim 11, wherein the third lens unit consists of one negative lens element or one cemented lens component.

13. A zoom lens comprising, in order from an object side to an image side:
a first lens unit having a positive refracting power;
a second lens unit having a negative refracting power;
a third lens unit having a negative refracting power; and
a fourth lens unit having a positive refracting power,
wherein during zooming from the wide angle end to the telephoto end, the first lens unit, the second lens unit, the third lens unit, and the fourth lens unit move in such a way that they are each located closer to the object side at the telephoto end than at the wide angle end, a distance between the first lens unit and the second lens unit is larger at the telephoto end than at the wide angle end, a distance between the second lens unit and the third lens unit is larger at the telephoto end than at the wide angle end, and a distance between the third lens unit and the fourth lens unit is smaller at the telephoto end than at the wide angle end,
wherein the zoom lens further comprises a fifth lens unit having a positive refracting power that is disposed on the image side of the fourth lens unit and moves during zooming from the wide angle end to the telephoto end in such a way that it is located closer to the object side at the telephoto end than at the wide angle end, and the distance between the fourth lens unit and the fifth lens unit is smaller at the telephoto end than at the wide angle end, and
the zoom lens satisfies the following conditions:

$$1.5 \leq f_1/(f_w \cdot f_T)^{1/2} \leq 2.1 \quad (1) \text{ and}$$

$$0.9 \leq f_2/f_3 \leq 1.7 \quad (2),$$

where $f_1$ is the focal length of the first lens unit, $f_2$ is the focal length of the second lens unit, $f_3$ is the focal length of the third lens unit, $f_w$ is the focal length of the entire zoom lens system at the wide angle end, and $f_T$ is the focal length of the entire zoom lens system at the telephoto end.

14. The zoom lens according to claim 13, wherein during zooming from the wide angle end to the telephoto end, the fourth lens unit and the fifth lens unit move in such a way that the following condition is satisfied:

$$0.01 < dD45/ft < 0.06 \quad (C),$$

where dD45 is the decrease in the distance between the fourth lens unit and the fifth lens unit with zooming from the wide angle end to the telephoto end.

15. The zoom lens according to claim 13, wherein the fifth lens unit comprises a cemented lens component having a negative refracting power including, in order from the object side to the image side, a positive meniscus lens element having a concave surface directed toward the object side, a negative meniscus lens element having a concave surface directed toward the object side, and a positive meniscus lens element having a concave surface directed toward the object side.

16. The zoom lens according to claim 13, wherein the fifth lens unit comprises a cemented lens component having a negative refracting power including, in order from the object side to the image side, a positive meniscus lens element having a concave surface directed toward the object side, a biconcave negative lens, and a biconvex positive lens, and satisfies the following condition:

$$1.3 \leq |f5cem|/fw \leq 2.5 \quad (5),$$

where f5cem is the composite focal length of the cemented lens component in the fifth lens unit.

17. The zoom lens according to claim 16, wherein the fifth lens unit comprises, in order from the object side to the image side, a biconvex lens component and the cemented lens component.

* * * * *